(12) United States Patent
Minamisawa

(10) Patent No.: US 9,810,918 B2
(45) Date of Patent: Nov. 7, 2017

(54) RESONANCE PREVENTION METHOD IN OPTICAL UNIT WITH SHAKE CORRECTION FUNCTION AND OPTICAL UNIT WITH SHAKE CORRECTION FUNCTION

(71) Applicant: NIDEC SANKYO CORPORATION, Suwa-gun, Nagano (JP)

(72) Inventor: Shinji Minamisawa, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 138 days.

(21) Appl. No.: 14/669,375

(22) Filed: Mar. 26, 2015

(65) Prior Publication Data
US 2015/0277140 A1  Oct. 1, 2015

(30) Foreign Application Priority Data
Mar. 27, 2014 (JP) .................. 2014-067070

(51) Int. Cl.
G02B 27/64 (2006.01)
G02B 7/02 (2006.01)
G03B 5/06 (2006.01)

(52) U.S. Cl.
CPC .......... *G02B 27/646* (2013.01); *G02B 7/023* (2013.01); *G02B 7/026* (2013.01); *G03B 5/06* (2013.01); *G03B 2205/0023* (2013.01)

(58) Field of Classification Search
None
See application file for complete search history.

(56) References Cited

U.S. PATENT DOCUMENTS 3,334,848 A * 8/1967 Iwai ................ B64D 47/08
                                                248/364
6,016,405 A * 1/2000 Watanabe ........ G02B 27/646
                                                310/326

(Continued)

FOREIGN PATENT DOCUMENTS

JP   2010096805 A   4/2010
JP   2010096863 A   4/2010

*Primary Examiner* — Derek S Chapel
(74) *Attorney, Agent, or Firm* — Cantor Colburn LLP

(57) ABSTRACT

An optical unit with a shake correction function may include a movable module holding an optical element, a support body including a body part surrounding the movable module, a gimbal mechanism including a movable frame having elasticity and configured to swingably support the movable module between the movable module and the support body, a spring member connected to the movable module and the support body for holding posture of the movable module, and a shake correction drive mechanism configured to swing the movable module. When a natural vibration frequency of the movable frame is "fa", a natural vibration frequency of the spring member is "fb", and a vibration frequency band of a movable body on which the support body is mounted is "fw", the natural vibration frequency "fa" and the natural vibration frequency "fb" are shifted from the vibration frequency band "fw". Further, it may be preferable that a difference between the natural vibration frequency "fa" and the natural vibration frequency "fb" is set to be 135 Hz or more.

21 Claims, 10 Drawing Sheets

(56) References Cited

U.S. PATENT DOCUMENTS 7,986,873 B2 * 7/2011 Ishihara ............... G02B 27/646
                                                    348/208.11
2011/0262121 A1 * 10/2011 Yanagisawa ............. G02B 7/08
                                                    396/55

* cited by examiner

Fig. 9 A
Fig. 9 B
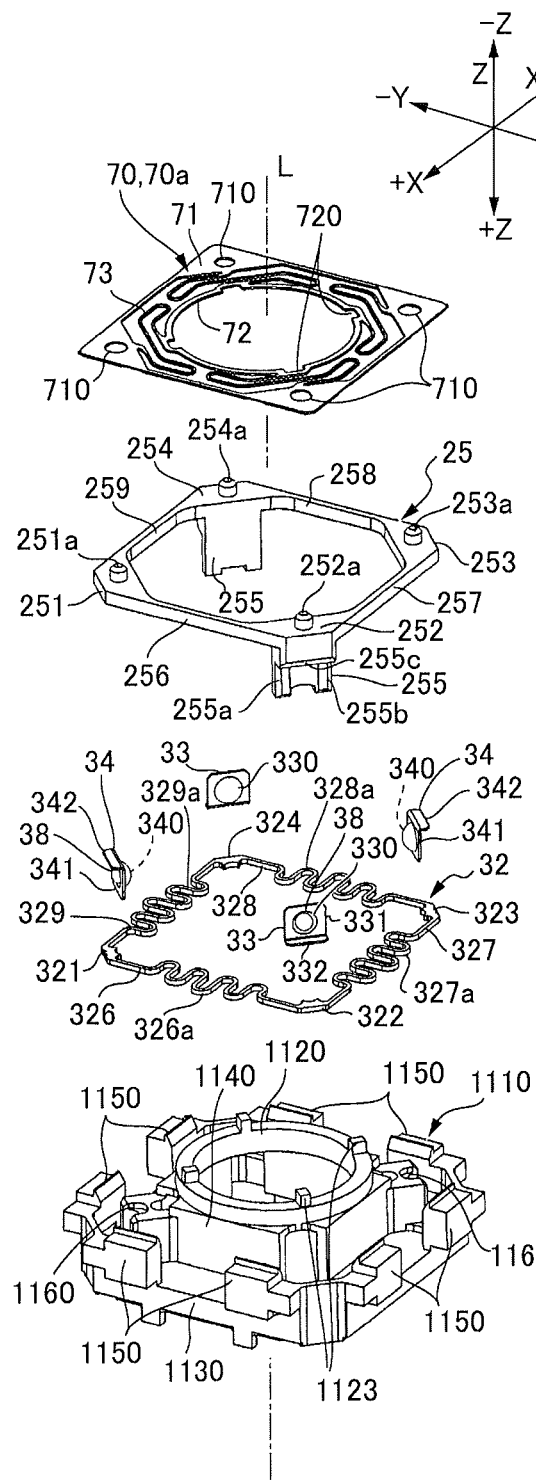
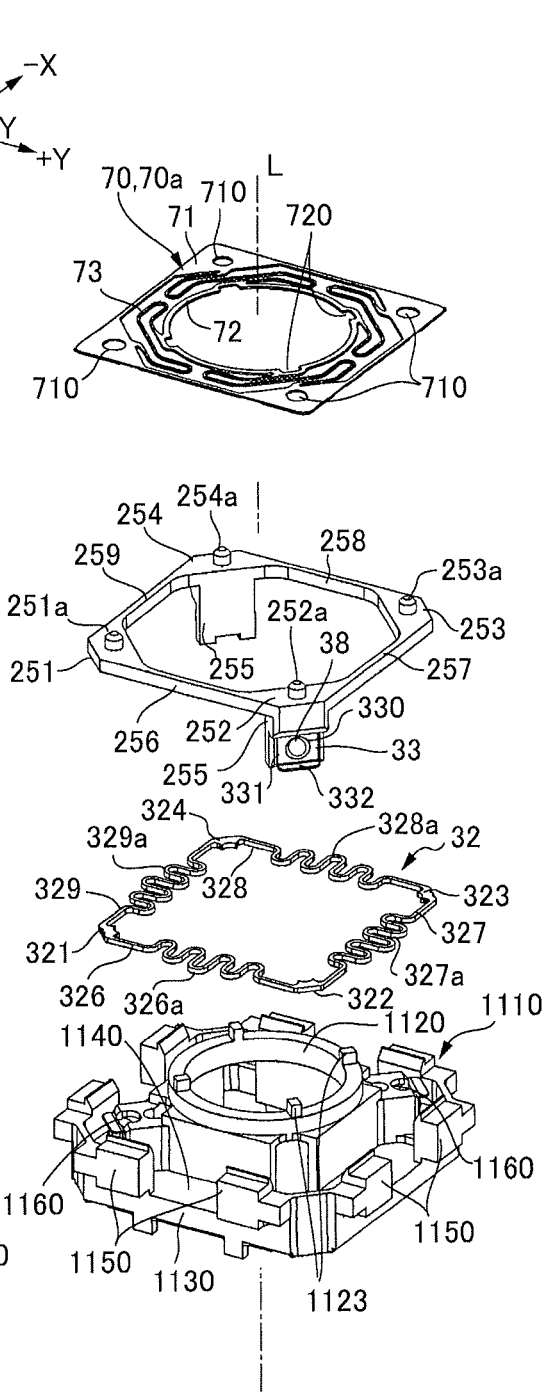

RESONANCE PREVENTION METHOD IN OPTICAL UNIT WITH SHAKE CORRECTION FUNCTION AND OPTICAL UNIT WITH SHAKE CORRECTION FUNCTION

CROSS REFERENCE TO RELATED APPLICATION

The present invention claims priority under 35 U.S.C. §119 to Japanese Application No. 2014-067070 filed Mar. 27, 2014, the entire content of which is incorporated herein by reference.

FIELD OF THE INVENTION

At least an embodiment of the present invention may relate to a resonance prevention method in an optical unit with a shake correction function which is capable of being mounted on a movable body such as a vehicle or a radio-controlled helicopter, and to an optical unit with a shake correction function.

BACKGROUND

In order to suppress disturbance of a photographed image due to a shake in an optical unit for photographing or the like, a structure has been proposed in which an optical module is structured as a movable module that is capable of being swung and a shake is corrected by swinging the movable module so as to correspond to the shake. For example, a structure has been proposed in which a movable module is swingably supported by a pivot provided on a rear side in an optical axis direction of the movable module and the movable module is swung with the pivot as a swing center so as to correct a shake of an optical unit (see, Japanese Patent Laid-Open No. 2010-96805 and Japanese Patent Laid-Open No. 2010-96863).

In a case of a structure that the movable module is swingably supported by a pivot provided on a rear side in an optical axis direction, a relatively small shake can be corrected but it is difficult to correct a large shake sufficiently.

In order to solve the problem, the present inventor has considered that a movable module is swingably supported by a gimbal mechanism with the use of a movable frame having elasticity, and that posture of the movable module is held by a spring member connected with the movable module and a support body. However, when two members having elasticity (movable frame and spring member) are used, the movable module has a plurality of natural vibration frequencies. As a result, when the optical module is mounted on a movable body such as a vehicle or a radio-controlled helicopter, the natural vibration frequencies of the movable module (natural vibration frequency of the movable frame and natural vibration frequency of the spring member) are overlapped with the vibration frequency band of the movable body and thus the movable module is resonated by vibration of the movable body.

For example, as shown in FIG. 10B, since a spring member holds a posture of the movable module, the spring member has a natural vibration frequency "fb'" of about 60 Hz in a tilt direction (swing direction) and the optical unit has a high gain for shake correction in a frequency band which is lower than the natural vibration frequency in the tilt direction. Further, the movable frame has a natural vibration frequency "fa1'" of about 120 Hz in an optical axis direction (upper and lower shift direction) and a natural vibration frequency "fa2'" of about 330 Hz in a lateral shift direction which is perpendicular to the optical axis direction. Therefore, there is a difference of 60 Hz between the natural vibration frequency "fb'" and the natural vibration frequency "fa1'". Accordingly, if a width of the vibration frequency band "fw'" is about 50 Hz when photographing is performed by the optical unit while the movable body such as a vehicle or a radio-controlled helicopter is moved, the vibration frequency band "fw'" is not overlapped with the natural vibration frequency "fb'" (about 60 Hz) in the tilt direction (swing direction) of the spring member and the natural vibration frequency "fa1'" (about 120 Hz) in the optical axis direction (upper and lower shift direction) of the movable frame. However, in the movable body such as a vehicle or a radio-controlled helicopter, photographing is performed by the optical unit while being accelerated or decelerated and thus a width of the vibration frequency band "fw'" may become 65 Hz. In this case, the vibration frequency band "fw'" of the movable body is overlapped with the natural vibration frequency "fb'" (about 60 Hz) in the tilt direction (swing direction) of the spring member and the natural vibration frequency "fa1'" (about 120 Hz) in the optical axis direction (upper and lower shift direction) of the movable frame and thereby the movable module is resonated.

In order to prevent the resonance, it may be structured that the optical module is mounted on the movable body through a buffer member, a buffer mechanism or the like. However, in this structure, much labor may be required for mounting the optical module on the movable body.

SUMMARY

In view of the problem described above, at least an embodiment of the present invention may advantageously provide a resonance prevention method in an optical unit with a shake correction function and an optical unit with a shake correction function in which, even when the optical unit is mounted on a movable body such as a vehicle or a radio-controlled helicopter, resonance of a movable module due to vibration of the movable body is suppressed by the optical unit by itself.

According to at least an embodiment of the present invention, there may be provided a resonance prevention method in an optical unit with a shake correction function for preventing resonance of a movable module when the optical unit is mounted on a movable body, the optical unit including the movable module holding an optical element, a support body having a body part surrounding the movable module, a gimbal mechanism including a movable frame having elasticity configured to swingably support the movable module between the movable module and the support body, a spring member connected to the movable module and the support body for holding posture of the movable module, and a shake correction drive mechanism configured to swing the movable module. When a natural vibration frequency of the movable frame is "fa", a natural vibration frequency of the spring member is "fb", and a vibration frequency band of the movable body on which the support body is mounted is "fw", the natural vibration frequency "fa" of the movable frame and the natural vibration frequency "fb" of the spring member are shifted from the vibration frequency band "fw" of the movable body.

Further, according to at least an embodiment of the present invention, there may be provided an optical unit with a shake correction function including a movable module which holds an optical element, a support body which includes a body part surrounding the movable module, a gimbal mechanism which includes a movable frame having elasticity configured to swingably support the movable module between the movable module and the support body, a spring member which is connected to the movable module and the support body for holding posture of the movable module, and a shake correction drive mechanism configured to swing the movable module. When a natural vibration frequency of the movable frame is "fa", a natural vibration frequency of the spring member is "fb", and a vibration frequency band of a movable body on which the support body is mounted is "fw", the natural vibration frequency "fa" of the movable frame and the natural vibration frequency "fb" of the spring member are shifted from the vibration frequency band "fw" of the movable body.

According to at least an embodiment of the present invention, a movable frame having elasticity and a spring member are disposed between a support body and a movable module. However, the natural vibration frequency "fa" of the movable frame and the natural vibration frequency "fb" of the spring member are shifted from the vibration frequency band "fw" of the movable body. Therefore, even when the optical unit is mounted on the movable body, resonance is hard to be generated in the movable module.

In at least an embodiment of the present invention, it is effective that the natural vibration frequency "fb" of the spring member and the vibration frequency band "fw" of the movable body satisfy the following relationship;

$$\text{"fb"} < \text{"fw"}.$$

The optical unit with a shake correction function has a high gain for shake correction in a frequency band which is lower than the natural vibration frequency in the tilt direction of the spring member. Therefore, in a case that the vibration frequency band "fw" of the movable body is higher than the natural vibration frequency "fb" of the spring member, shake correction is hard to be performed effectively. However, the natural vibration frequency "fa" of the movable frame and the natural vibration frequency "fb" of the spring member are shifted from the vibration frequency band "fw" of the movable body and thus, even when the optical unit with a shake correction function is mounted on the movable body, resonance is hard to be generated in the movable module.

In at least an embodiment of the present invention, it is preferable that the natural vibration frequency "fa" of the movable frame, the natural vibration frequency "fb" of the spring member, and the vibration frequency band "fw" of the movable body satisfy the following relationship;

$$\text{"fb"} < \text{"fw"} < \text{"fa"}.$$

In other words, it is preferable that the natural vibration frequency "fb" of the spring member is shifted to a low frequency side and the natural vibration frequency "fa" of the movable frame is shifted to a high frequency side and thereby a difference between the natural vibration frequency "fa" of the movable frame and the natural vibration frequency "fb" of the spring member is widened and, as a result, the vibration frequency band "fw" of the movable body is located between the natural vibration frequency "fa" of the movable frame and the natural vibration frequency "fb" of the spring member. According to this structure, since the natural vibration frequency "fb" (specifically, the natural vibration frequency in a swing direction) of the spring member is shifted to a low frequency side, a spring coefficient of the spring member becomes small. Therefore, a torque required to swing the movable module by the shake correction drive mechanism becomes small. Specifically, the natural vibration frequency in a swing direction of the movable module is specified by the natural vibration frequency "fb" of the spring member.

In at least an embodiment of the present invention, it is preferable that a difference between the natural vibration frequency "fa" of the movable frame and the natural vibration frequency "fb" of the spring member is set to be 135 Hz or more. According to this structure, for example, during an image-pickup period, even when the vibration frequency band "fw" of the movable body has a width of ±65 Hz (width of 130 Hz) due to acceleration and deceleration of the movable body such as a vehicle or a radio-controlled helicopter, the natural vibration frequency "fa" of the movable frame and the natural vibration frequency "fb" of the spring member are shifted from the vibration frequency band "fw" of the movable body. Further, in a case that a difference between the natural vibration frequency "fa" of the movable frame and the natural vibration frequency "fb" of the spring member is set to more than 135 Hz, it is not preferable for holding the posture of the movable module and the like. However, a margin of about 5 Hz is provided with respect to the width of 130 Hz (±65 Hz) of the vibration frequency band "fw" of the movable body and thus holding of the posture of the movable module and the like can be appropriately performed while preventing resonance of the movable module.

According to at least an embodiment of the present invention, there may be provided an optical unit with a shake correction function including a movable module which holds an optical element, a support body which includes a body part surrounding the movable module, a gimbal mechanism which includes a movable frame having elasticity configured to swingably support the movable module between the movable module and the support body, a spring member which is connected to the movable module and the support body for holding posture of the movable module, and a shake correction drive mechanism configured to swing the movable module. When a natural vibration frequency of the movable frame is "fa", a natural vibration frequency of the spring member is "fb", a difference between the natural vibration frequency "fa" of the movable frame and the natural vibration frequency "fb" of the spring member is set to be 135 Hz or more.

According to at least an embodiment of the present invention, for example, during an image-pickup period, even when the vibration frequency band "fw" of the movable body has a width of ±65 Hz (width of 130 Hz) due to acceleration and deceleration of the movable body such as a vehicle or a radio-controlled helicopter, the natural vibration frequency "fa" of the movable frame and the natural vibration frequency "fb" of the spring member are shifted from the vibration frequency band "fw" of the movable body. Further, in a case that a difference between the natural vibration frequency "fa" of the movable frame and the natural vibration frequency "fb" of the spring member is set to be more than 135 Hz, it is not preferable for holding the posture of the movable module and the like. However, a margin of about 5 Hz is provided with respect to the width of 130 Hz (±65 Hz) of the vibration frequency band "fw" of the movable body and thus holding of the posture of the movable module and the like can be appropriately performed while preventing resonance of the movable module.

In at least an embodiment of the present invention, it is effective that the natural vibration frequency "fa" of the movable frame and the natural vibration frequency "fb" satisfy the following relationship;

"fb"<"fa".

The optical unit has a high gain for shake correction in a frequency band which is lower than the natural vibration frequency in the tilt direction of the spring member. Therefore, in a case that the vibration frequency band "fw" of the movable body is higher than the natural vibration frequency "fb" of the spring member, shake correction is hard to be performed effectively. However, the natural vibration frequency "fa" of the movable frame and the natural vibration frequency "fb" of the spring member are shifted from the vibration frequency band "fw" of the movable body and thus, even when the optical unit with a shake correction function is mounted on the movable body, resonance is hard to be generated in the movable module.

In at least an embodiment of the present invention, it is preferable that, in the natural vibration frequency "fa" of the movable frame, when a natural vibration frequency in an optical axis direction is "fa1" and a natural vibration frequency in a direction perpendicular to the optical axis is "fa2", the natural vibration frequency "fa1" and the natural vibration frequency "fa2" satisfy the following relationship;

"fa1"<"fa2".

In this case, a natural vibration frequency in the optical axis direction of the movable module is specified by the natural vibration frequency "fa1" in the optical axis direction of the natural vibration frequency "fa" of the movable frame, and a natural vibration frequency in a direction perpendicular to the optical axis direction of the movable module is specified by the natural vibration frequency "fa2" in the direction perpendicular to the optical axis direction of the natural vibration frequency "fa" of the movable frame. According to this structure, in the natural vibration frequency "fa" of the movable frame, when the natural vibration frequency "fa1" in the optical axis direction is set to a high frequency side with respect to the vibration frequency band "fw" of the movable body, the natural vibration frequency "fa2" in the direction perpendicular to the optical axis is also set on a high frequency side with respect to the vibration frequency band "fw" of the movable body.

In at least an embodiment of the present invention, it is preferable that the movable frame is structured of a plurality of plate members having the same shape and are bonded with each other in the optical axis direction. According to this structure, even when the movable frame is formed by etching on a metal plate, accuracy of the shape and the width dimension can be enhanced.

In at least an embodiment of the present invention, it is preferable that the spring member is a plate-shaped spring whose thickness direction is directed in the optical axis direction.

In at least an embodiment of the present invention, it may be structured that the optical element is a lens which is held by a holder, the movable module is mounted with a coil structuring the shake correction drive mechanism, the movable frame of the gimbal mechanism is provided at a midway position of the movable module in an optical axis direction of the lens so that the movable module is swing with the midway position of the movable module as a swing center, a flexible circuit board which is electrically connected with the coil structuring the shake correction drive mechanism is led around so as to enable to swing the movable module on one side in the optical axis direction with respect to the gimbal mechanism, and the spring member is provided on the other side in the optical axis direction with respect to the gimbal mechanism. In this case, it may be structured that the movable frame is formed in a rectangular shape having four corner parts, the movable frame is provided with meandering parts which are formed by curving a linear shape having a constant width between respective corner parts, and the movable module is swingably supported by the movable frame around a first axial line intersecting the optical axis direction of the lens and around a second axial line intersecting the optical axis direction and the first axial line. Further, it may be structured that the spring member is provided with a support body side connecting part in a rectangular frame shape, a movable body side connection part in a circular ring shape, and arm parts which connect the support body side connecting part with the movable body side connection part, and the arm part is extended to the movable body side connection part while turning around from a corner portion of the support body side connecting part in a circumferential direction.

In at least an embodiment of the present invention, it is preferable that the optical unit with a shake correction function is, specifically, mounted on the movable body which is subjected to be accelerated and decelerated and in which vibration and swinging are occurred, and the vibration frequency band "fw" of the movable body is determined on the basis of vibration of the movable body due to assumed vibration, swinging and acceleration or deceleration. A vehicle and a radio-controlled helicopter may be an example of the movable body which occurs vibration and swinging in itself and is accelerated or decelerated. Particularly, in a radio-controlled helicopter, in addition to its swinging, acceleration or deceleration, vibration of a rotor part for rotating its propeller is added and thus the structure of the present application is especially effective.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 9A and 9B are explanatory views showing a gimbal mechanism and the like which are used in an optical unit with a shake correction function in accordance with an embodiment of the present invention.

DETAILED DESCRIPTION OF THE PREFERRED EMBODIMENTS

An embodiment of the present invention will be described below with reference to the accompanying drawings. In the following description, a structure for preventing a hand shake to an optical module for photographing will be described as an example. Further, in the following description, three directions perpendicular to each other are set to be an "X"-axis direction, a "Y"-axis direction and a "Z"-axis direction. A first direction along an optical axis "L" ((lens optical axis, optical axis of an optical element) is set to be the "Z"-axis direction, a second direction intersecting the "Z"-axis direction (first direction) is set to be the "Y"-axis direction, and a third direction intersecting the "Z"-axis direction (first direction) and the "Y"-axis direction (second direction) is set to be the "X"-axis direction. Further, in the following description, regarding swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" is indicated on one side in the "X"-axis direction, "−X" is indicated on the other side, "+Y" is indicated on one side in the "Y"-axis direction, "−Y" is indicated on the other side, "+Z" is indicated on one side (opposite side to an object side/rear side in an optical axis direction) in the "Z"-axis direction, and "−Z" is indicated on the other side (object side/front side in the optical axis direction).

(Entire Structure of Optical Unit for Photographing)

Figure 1:
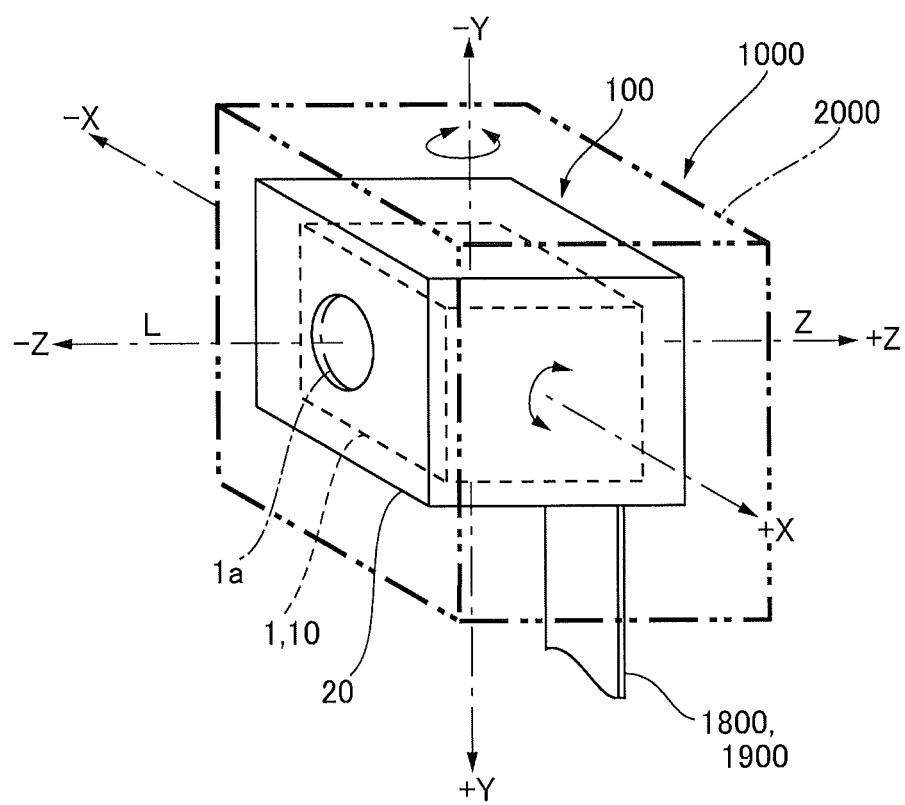
FIG. 1 is an explanatory perspective view schematically showing a state that an optical unit with a shake correction function in accordance with an embodiment of the present invention is mounted on a movable body such as a vehicle or a radio-controlled helicopter.

FIG. 1 is an explanatory perspective view schematically showing a state that an optical unit with a shake correction function in accordance with an embodiment of the present invention is mounted on a movable body such as a vehicle or a radio-controlled helicopter.

An optical unit 100 (optical unit with a shake correction function) shown in FIG. 1 is a camera mounted on a movable body 1000 such as a vehicle or a radio-controlled helicopter and is mounted in a supported state by a chassis of the movable body 1000. In the optical unit 100, when a shake such as a hand shake is occurred in an optical device 2000 at the time of photographing, disturbance occurs in a photographed image. Therefore, in the optical unit 100 in this embodiment, as described below, a movable module 10 including an optical module 1 whose optical axis "L" is extended along a "Z"-axis direction is swingably supported in an inside of a support body 20. Further, the optical unit 100 includes a shake correction drive mechanism (not shown in FIG. 1) for swinging the movable module 10 based on a detected result of a hand shake by using a gyroscope (shake detection sensor) mounted on the optical unit 100. Flexible circuit boards 1800 and 1900 are extended from the optical unit 100 for supplying power to the optical module 1 and the shake correction drive mechanism. The flexible circuit boards 1800 and 1900 are electrically connected with a host control section and the like. In the movable module 10, the optical module 1 includes a lens 1a whose optical axis "L" is extended along the "Z"-axis direction as an optical element. In this embodiment, when viewed in a direction of the optical axis "L", the lens 1a is formed in a circular shape but the movable module 10 and the optical module 1 are formed in a quadrangular shape.

(Schematic Structure of Optical Unit 100)

Figure 2:
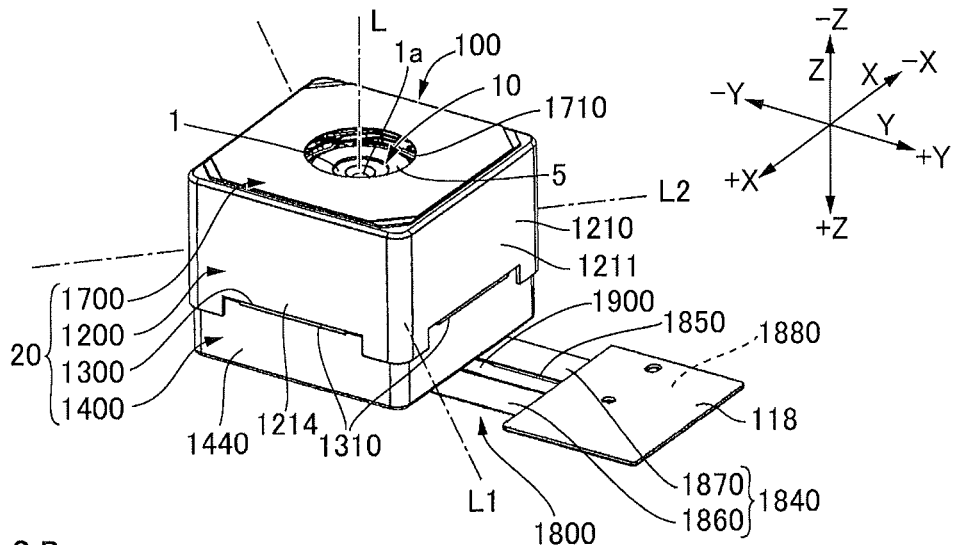
FIGS. 2A and 2B are explanatory perspective views showing an optical unit with a shake correction function in accordance with an embodiment of the present invention which is viewed from an object to be photographed side.
Figure 2:
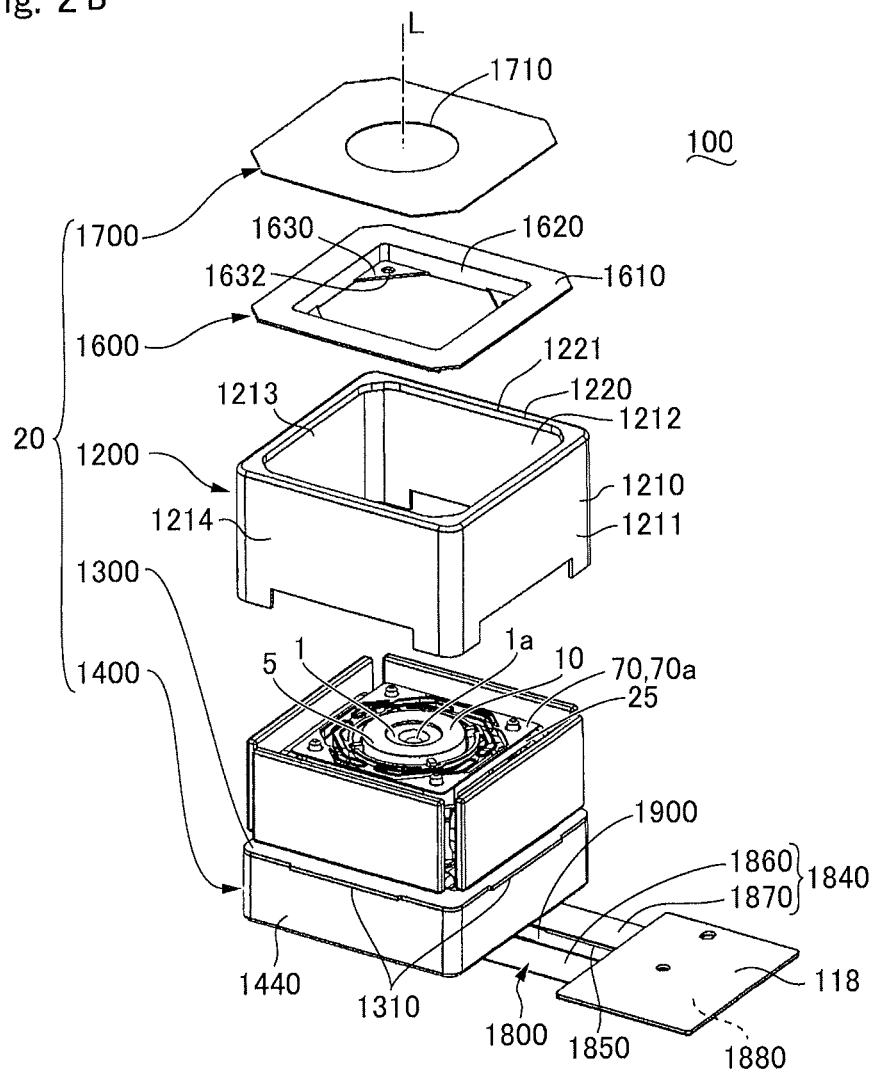
Figure 3:
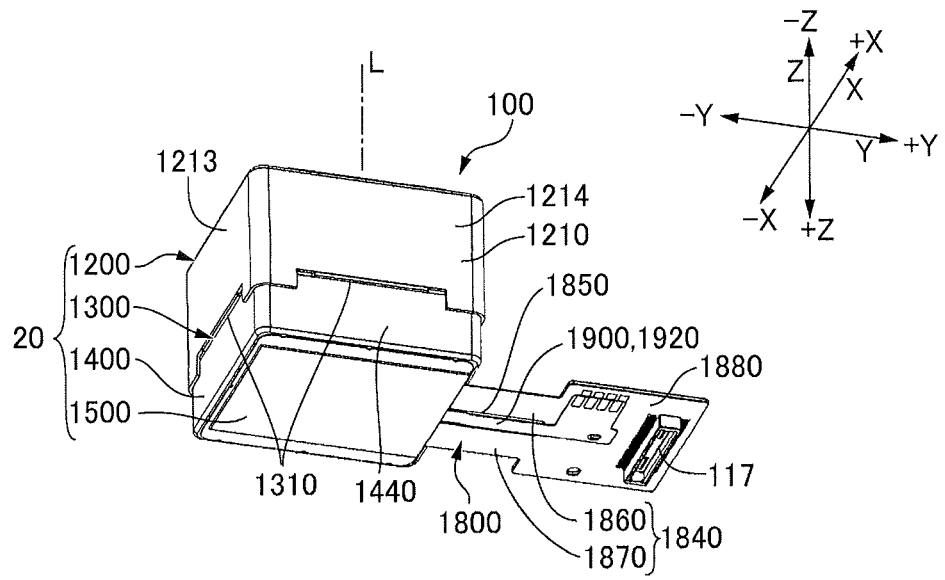
FIGS. 3A and 3B are explanatory perspective views showing an optical unit with a shake correction function in accordance with an embodiment of the present invention which is viewed from an opposite side to an object to be photographed side.
Figure 3:
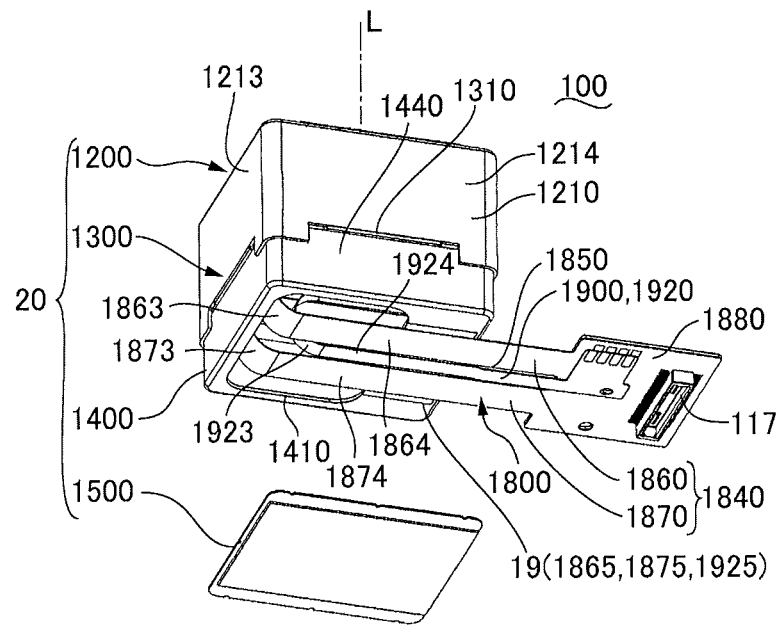
Figure 4:
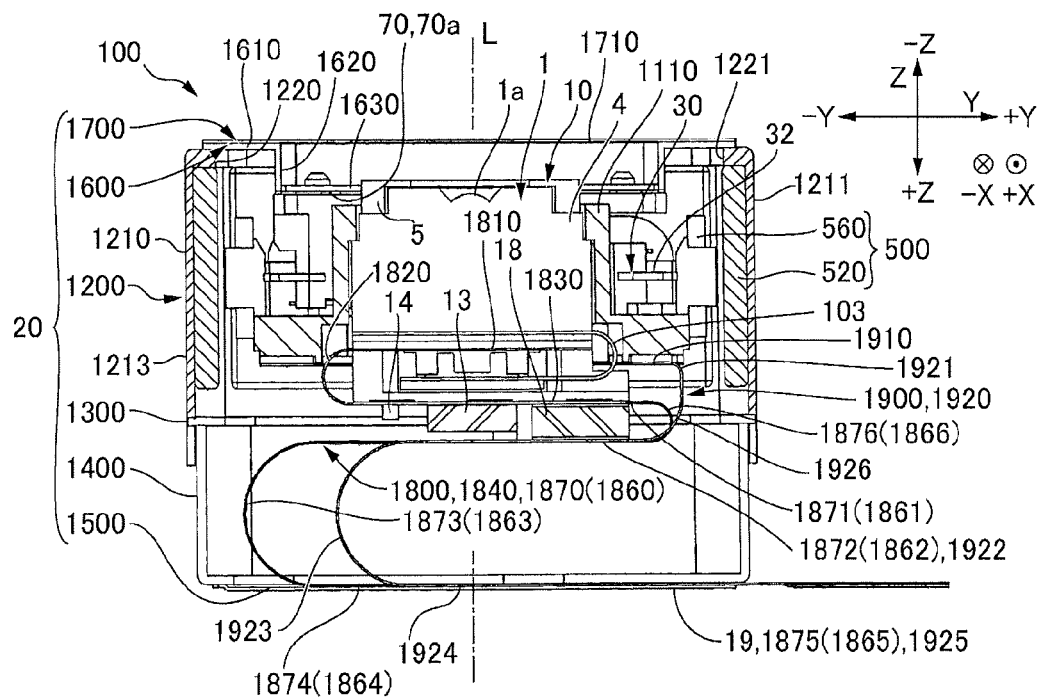
FIGS. 4A and 4B are explanatory cross-sectional views showing an optical unit with a shake correction function in accordance with an embodiment of the present invention.
Figure 4:
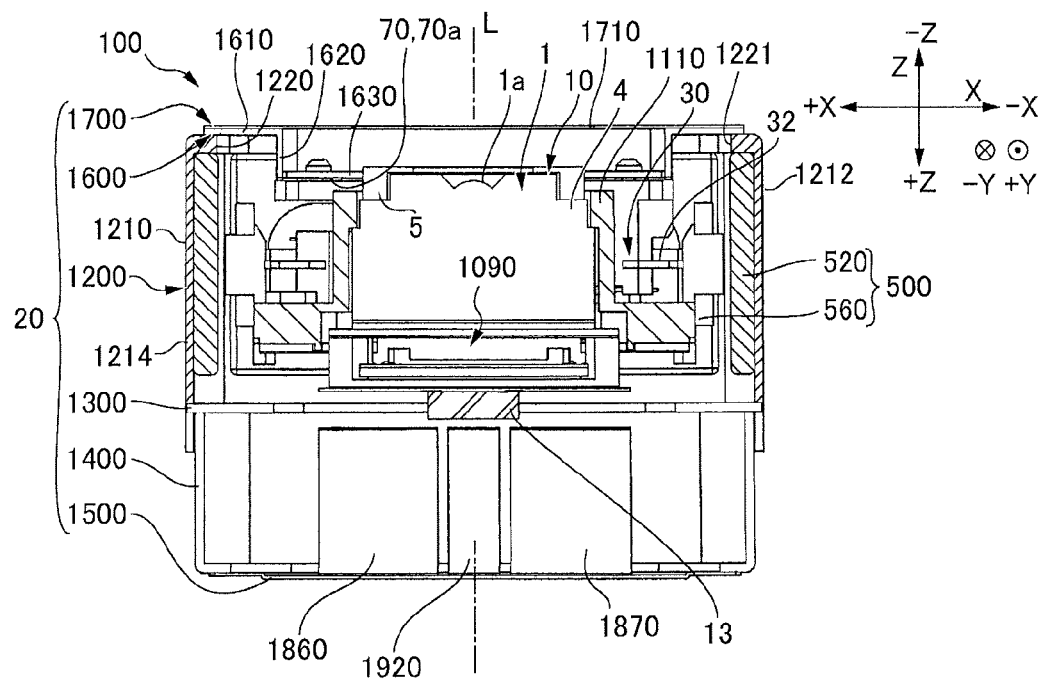
Figure 5:
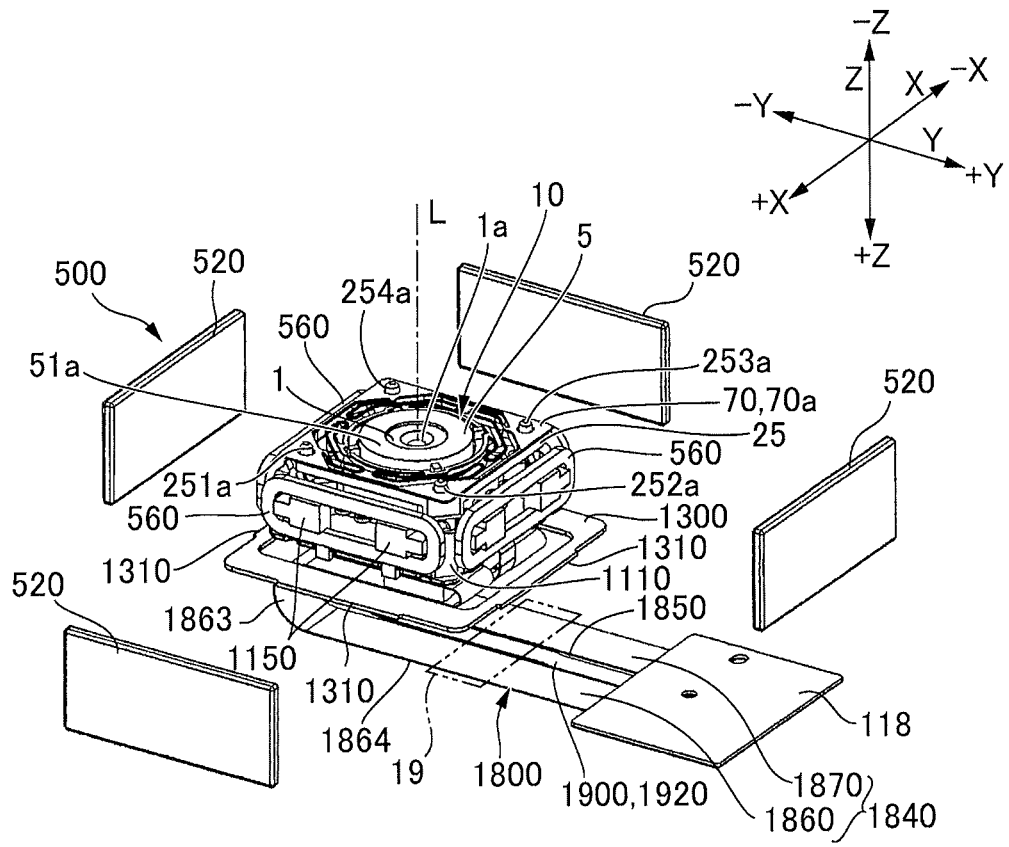
FIG. 5 is an exploded perspective view showing an inside of an optical unit with a shake correction function in accordance with an embodiment of the present invention.
Figure 5:
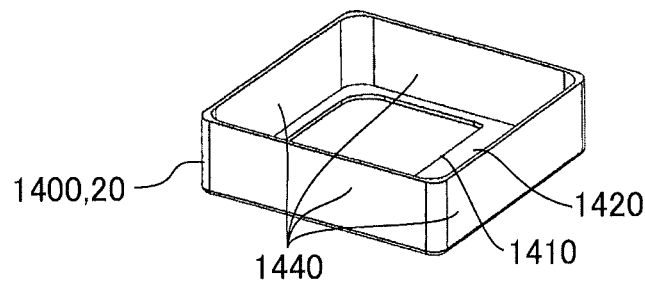
Figure 5:
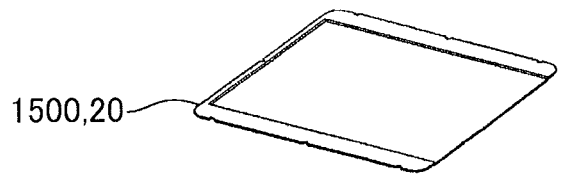

FIGS. 2A and 2B are explanatory perspective views showing an optical unit 100 with a shake correction function in accordance with an embodiment of the present invention which is viewed from an object to be photographed side (the other side "−Z" in the "Z"-axis direction). FIG. 2A is a perspective view showing the optical unit 100 which is viewed from an object side and FIG. 2B is an exploded perspective view showing the optical unit 100. FIGS. 3A and 3B are explanatory perspective views showing the optical unit 100 with a shake correction function in accordance with an embodiment of the present invention which is viewed from an opposite side (one side "+Z" in the "Z"-axis direction) to the object side. FIG. 3A is a perspective view showing the optical unit 100 which is viewed from an opposite side to the object side and FIG. 3B is an exploded perspective view showing the optical unit 100. FIGS. 4A and 4B are explanatory cross-sectional views showing the optical unit 100 with a shake correction function in accordance with an embodiment of the present invention. FIG. 4A is a "YZ" cross-sectional view showing the optical unit 100 and FIG. 4B is a "ZX" cross-sectional view showing the optical unit 100. FIG. 5 is a finely exploded perspective view showing an inside of the optical unit 100 with a shake correction function in accordance with an embodiment of the present invention. In FIG. 4A, portions of a first belt-shaped part 1860 corresponding to a second belt-shaped part 1870 are indicated by using reference signs with a parenthesis.

In FIGS. 2A and 2B, FIGS. 3A and 3B, FIGS. 4A and 4B and FIG. 5, the optical unit 100 in this embodiment includes a support body 20, a movable module 10, a gimbal mechanism 30 (see FIGS. 4A and 4B) as a support mechanism which supports the movable module 10 in a swingable state with respect to the support body 20, and a shake correction drive mechanism 500 (see FIGS. 4A and 4B) configured to generate a magnetic-drive force between the movable module 10 and the support body 20 for relatively displacing the movable module 10 with respect to the support body 20.

The support body 20 includes a case 1200. The case 1200 is provided with a body part 1210 in a rectangular tube shape surrounding the movable module 10 and an end plate part 1220 in a rectangular frame shape which is protruded to an inner side in a radial direction from an end part on the other side "−Z" in the "Z"-axis direction of the body part 1210. A rectangular window 1221 is formed in the end plate part 1220. Further, the support body 20 includes a cover 1600 which is fixed to the case 1200 on the other side "−Z" in the "Z"-axis direction and a cover sheet 1700 which is fixed to the cover 1600 on the other side "−Z" in the "Z"-axis direction. The cover 1600 is provided with a plate-shaped frame part 1610 which is overlapped with the end plate part 1220 of the case 1200 and a side plate part 1620 in a rectangular tube shape which is bent to one side "+Z" in the "Z"-axis direction from an inner circumferential edge of the frame part 1610. The side plate part 1620 is inserted into an inner side with respect to the case 1200 through an opening part 1221 of the case 1200. Four corner portions of an end part on one side "+Z" in the "Z"-axis direction of the side plate part 1620 are formed with triangular plate-shaped connecting parts 1630 and the connecting part 1630 is formed with a hole 1632 for fixing a rectangular frame 25 described below. In this embodiment, the cover sheet 1700 is formed with a window 1710 through which light from an object to be photographed is incident on the optical module 1.

(Structure of Shake Correction Drive Mechanism 500)

As shown in FIGS. 4A and 4B and FIG. 5, the shake correction drive mechanism 500 is a magnetic-drive mechanism which utilizes plate-shaped magnets 520 and coils 560. The coils 560 are held by the movable module 10 and the magnets 520 are held by inner faces of four side plate parts 1211, 1212, 1213 and 1214 of the body part 1210 of the case 1200. In this embodiment, an outer face side and an inner face side of the magnet 520 are magnetized in different poles from each other. Further, the permanent magnet 520 is comprised of two magnet pieces which are divided in the optical axis "L" direction and the faces of the magnet pieces facing the coil 560 are magnetized in different poles from each other in the optical axis "L" direction. Therefore, upper and lower long side portions of the coil 560 are utilized as effective sides. In this embodiment, magnetizing patterns on outer face sides and inner face sides of four magnets 520 are the same as each other. Therefore, the magnets 520 adjacent to each other in a circumferential direction are not attracted to each other and thus assembling is easily performed.

The case 1200 is structured of magnetic material and functions as a yoke for the magnets 520. The end plate part 1220 of the case 1200 is formed with a window 1221 whose opening edge is located on an outer side in a radial direction with respect to the faces of the magnets 520 facing the coils 560 when viewed in the "Z"-axis direction. Therefore, magnetic lines of force of the magnet 520 are suppressed from being reached to the end plate part 1220 of the case 1200 (yoke) on a front side in the optical axis "L" direction.

(Structure of Movable Module 10)

Figure 6:
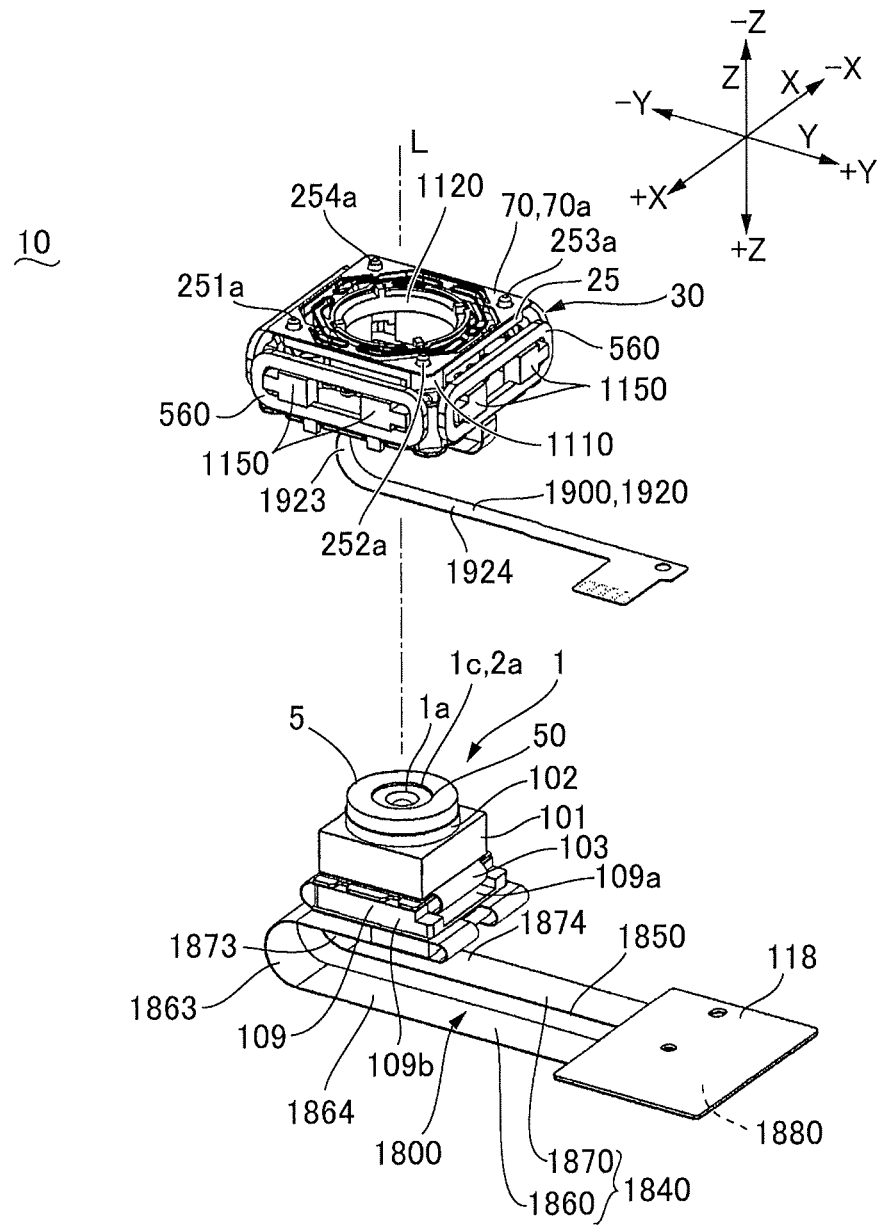
FIG. 6 is an exploded perspective view showing a disassembled state of a movable module of an optical unit with a shake correction function in accordance with an embodiment of the present invention which is viewed from an object side.
Figure 7A:
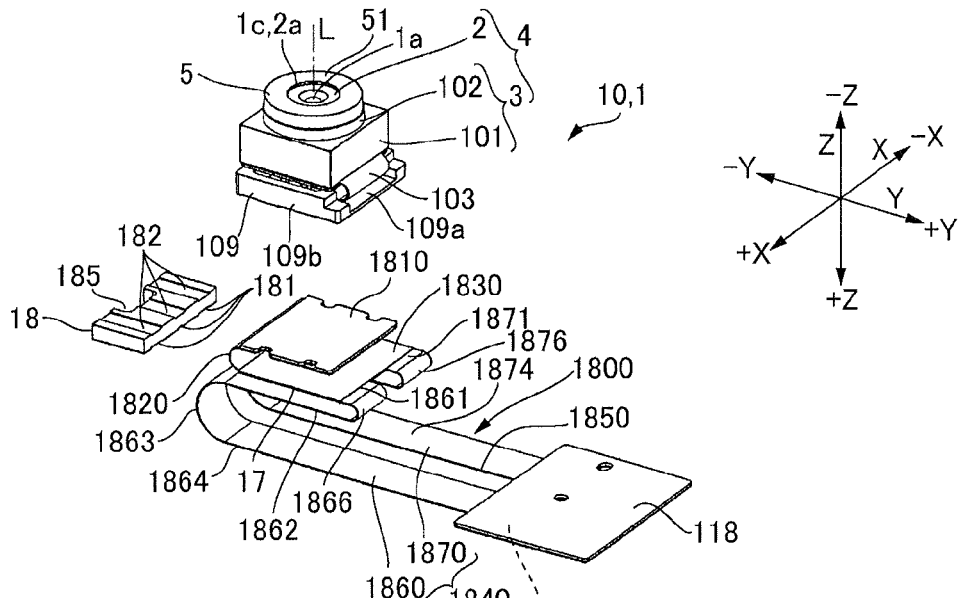
FIGS. 7A, 7B, and 7C are exploded perspective views showing an optical module and the like used in the movable module shown in FIG. 6 which are viewed from an object side.
Figure 7A:
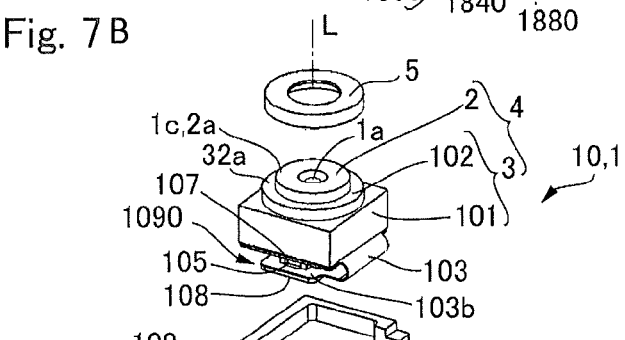
Figure 7B:
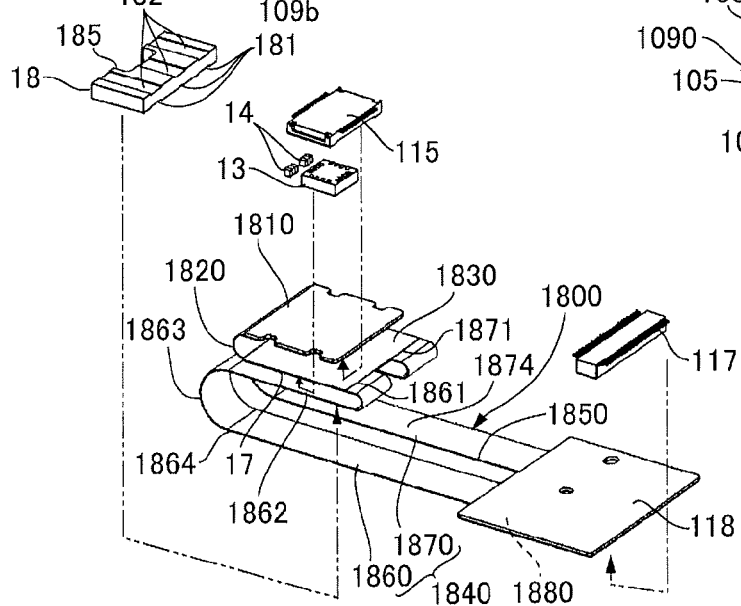
Figure 7C:
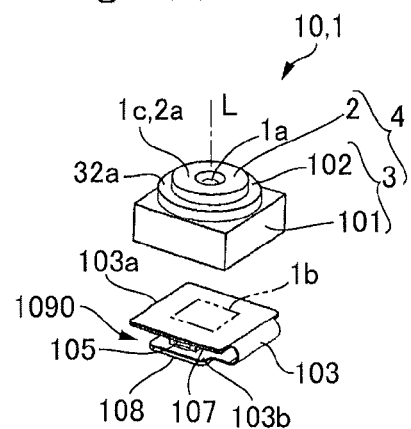

FIG. 6 is an exploded perspective view showing a disassembled state of the movable module 10 of the optical unit 100 with a shake correction function in accordance with an embodiment of the present invention which is viewed from an object side (the other side "−Z" in the "Z"-axis direction). FIGS. 7A, 7B and 7C are exploded perspective views showing the optical module 1 and the like used in the movable module 10 shown in FIG. 6 which are viewed from an object side (the other side "−Z" in the "Z"-axis direction). FIG. 7A is an exploded perspective view showing a state in which the optical module 1 and a flexible circuit board 1800 are disassembled, FIG. 7B is an exploded perspective view showing a state in which the optical module 1 and the like are further disassembled, and FIG. 7C is an explanatory view showing an imaging element 1b and the like.

As shown in FIGS. 4A and 4B, FIG. 5 and FIG. 6, the movable module 10 includes the optical module 1 having a lens 1a (optical element) and a weight 5. The optical module 1 includes a holder 4 which holds the lens 1a and a frame 1110 which holds the holder 4.

In FIGS. 4A and 4B, FIGS. 5 and 6, and FIGS. 7A, 7B and 7C, the holder 4 is, for example, provided with a main body part 101 having a rectangular solid shape and a cylindrical tube part 102 which is protruded to the other side "−Z" in the "Z"-axis direction from the main body part 101. The lens 1a and an actuator (not shown) for focusing driving are provided in an inside of the holder 4. Further, a circuit module 1090 for photographing is provided at an end part on one side "+Z" in the "Z"-axis direction of the main body part 101 and the circuit module 1090 for photographing includes a flexible mounting circuit board 103 which is bent in a "U"-shape. In the mounting circuit board 103, an imaging element 1b is mounted on a face of a portion 103a located on the other side "−Z" in the "Z"-axis direction which faces the other side "−Z" in the "Z"-axis direction. Further, a plug 105 of a "b-to-b" connector is mounted on a face of a portion 103b located on the one side "+Z" in the "Z"-axis direction which faces the other side "−Z". In the mounting circuit board 103, a reinforcing plate 107 is adhesively fixed to a face of the portion 103a located on the other side "−Z" in the "Z"-axis direction which faces the one side "+Z" in the "Z"-axis direction, and a reinforcing plate 108 is adhesively fixed to a face of the portion 103b located on the one side "+Z" in the "Z"-axis direction which faces the one side "+Z".

In the optical module 1 structured as described above, the holder 4 is held on an inner side of a frame 1110 described below and, in this state, the holder 4 is covered by a protection plate 109 from the one side "+Z" in the "Z"-axis direction. The protection plate 109 is provided with a rectangular end plate part 109a which covers the frame 1110 from the one side "+Z" in the "Z"-axis direction, and a side plate part 109b which is protruded to the other side "−Z" in the "Z"-axis direction from three sides except the one side "+Y" in the "Y"-axis direction of four sides of the rectangular end plate part 109a.

(Structure of Signal Outputting Flexible Circuit Board 1800)

As shown in FIGS. 4A and 4B, FIGS. 5 and 6, and FIGS. 7A, 7B and 7C, a signal outputting flexible circuit board 1800 for outputting a signal obtained by the imaging element 1b is connected with the optical module 1. In a case that an actuator (not shown) for focusing driving is provided in an inside of the optical module 1, a drive current is supplied to the actuator through the flexible circuit board 1800.

The flexible circuit board 1800 is provided with a first connected part 1810 in a rectangular shape which is disposed between the portion 103b of the mounting circuit board 103 located on the one side "+Z" in the "Z"-axis direction and the portion 103a located on the other side "−Z", a curved part 1820 which is curved toward a rear side in the optical axis "L" direction (one side "+Z" in the "Z"-axis direction) at an end part on the other side "−Y" in the "Y"-axis direction of the first connected part 1810, a second connected part 1830 in a rectangular shape which is connected with the curved part 1820 on the one side "+Y" in the "Y"-axis direction, and a leading-around part 1840 which is led out from the second connected part 1830 to an outer side.

A face of the first connected part 1810 which faces the one side "+Z" in the "Z"-axis direction is mounted with a socket 115 which is engaged with the plug 105. Further, a connector 117 is mounted on a face on the one side "+Z" in the "Z"-axis direction of an end part 1880 on the one side "+Y" in the "Y"-axis direction of the leading-around part 1840. Therefore, a signal obtained in the imaging element 1b is outputted through the mounting circuit board 103, the "b-to-b" connector (plug 105 and socket 115), the flexible circuit board 1800 and the connector 117. A reinforcing plate 118 is adhesively fixed to a face on the other side "−Z" in the "Z"-axis direction of the end part 1880.

A face on the other side "−Z" in the "Z"-axis direction of the second connected part 1830 of the flexible circuit board 1800 is fixed to a face on the one side "+Z" in the "Z"-axis direction of the protection plate 109 by using an adhesive. Therefore, a rear side end face 17 in the optical axis "L" direction (end face on the one side "+Z" in the "Z"-axis direction) of the movable module 10 is structured of the face on the one side "+Z" in the "Z"-axis direction of the second connected part 1830 of the flexible circuit board 1800. In this embodiment, the rear side end face 17 in the optical axis "L" direction of the movable module 10 (face on the one side "+Z" in the "Z"-axis direction of the second connected part 1830 of the flexible circuit board 1800) is mounted with a gyroscope 13 and electronic components 14 such as a capacitor.

In this embodiment, the leading-around part 1840 is divided into a first belt-shaped part 1860 and a second belt-shaped part 1870 parallel to each other in the "X"-axis direction by a slit 1850 extended in the "Y"-axis direction. Dimensions (widths) in the "X"-axis direction of the first belt-shaped part 1860 and the second belt-shaped part 1870 are equal to each other. Further, the widths of the first belt-shaped part 1860 and the second belt-shaped part 1870 are larger than a width of the slit 1850.

(Structure of Frame 1110)

Figure 8:
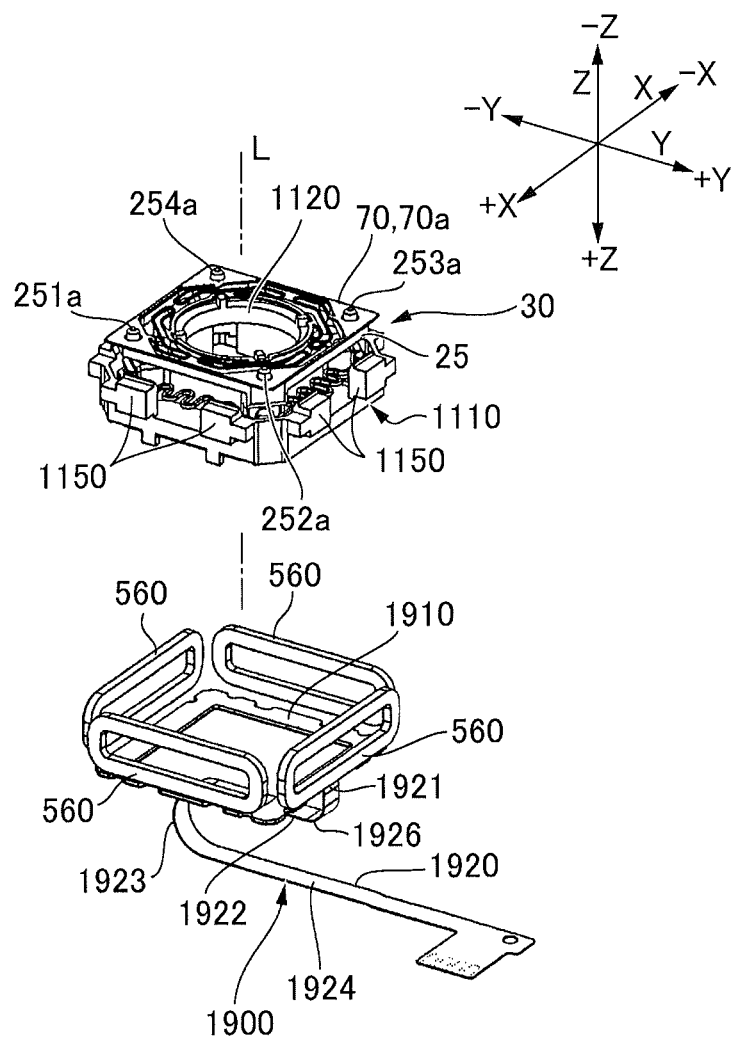
FIG. 8 is an exploded perspective view showing a frame and the like used in the movable module shown in FIG. 6 which are viewed from an object side.

FIG. 8 is an exploded perspective view showing the frame 1110 and the like used in the movable module 10 shown in FIG. 6 which are viewed from an object side (the other side "−Z" in the "Z"-axis direction). FIGS. 9A and 9B are explanatory views showing a gimbal mechanism and the like which are used in the optical unit 100 with a shake correction function in accordance with an embodiment of the present invention. FIG. 9A is an exploded perspective view showing a gimbal mechanism and the like which is viewed from an object side (the other side "−Z" in the "Z"-axis direction), and FIG. 9B is an explanatory view showing a supporting point of the gimbal mechanism.

As shown in FIGS. 4A and 4B, FIGS. 5, 6 and 8, and FIGS. 9A and 9B, the frame 1110 structures an outer peripheral portion of the movable module 10. The frame 1110 is provided with a holder holding part 1120 in a tube shape which holds the holder 4 on its inner side and a flange part 1130 having a large wall thickness which is enlarged from an end part on the one side "+Z" in the "Z"-axis direction of the holder holding part 1120.

As shown in FIGS. 9A and 9B, a movable frame arrangement space 1140 where a movable frame 32 of the gimbal mechanism 30 is disposed and a coil holding part 1150 which holds the coils 560 on an outer side with respect to the movable frame arrangement space 1140 are provided on an outer side in the radial direction with respect to the holder holding part 1120 of the frame 1110. The coil holding part 1150 is structured of a portion which is protruded toward the other side "−Z" in the "Z"-axis direction from an outer side edge of the flange part 1130 on an outer side in the radial direction with respect to the movable frame arrangement space 1140. The coil holding part 1150 is formed at four positions in a circumferential direction. In this embodiment, in the four coil holding parts 1150, the coil holding part 1150 located in the "X"-axis direction is divided into two protruded parts in the "Y"-axis direction and the coil holding part 1150 located in the "Y"-axis direction are divided into two protruded parts in the "X"-axis direction. The coil 560 is an air-core coil and is adhesively bonded to the coil holding part 1150 in a state that the coil holding part 1150 is fitted to an opening part of the air-core coil. In this state, a part of the coil holding part 1150 is protruded from an outer face of the coil 560 (face which faces the magnet 520).

(Structure of Flexible Circuit Board 1900 for Power Feeding)

As shown in FIGS. 5, 6 and 8, in the movable module 10, an end part on the one side "+Z" in the "Z"-axis direction of the movable module 10 is connected with a flexible circuit board 1900 for power feeding to the coils 560. The flexible circuit board 1900 is provided with a rectangular frame portion 1910, which is extended along an outer side edge of the frame 1110 on the one side "+Z" in the "Z"-axis direction of the frame 1110, and a leading-around part 1920 in a belt shape which is extended from the rectangular frame portion 1910. The four coils 560 are connected with the rectangular frame portion 1910.

In this embodiment, a width of the leading-around part 1920 is slightly smaller than a width of the slit 1850 of the flexible circuit board 1800. When viewed in the "Z"-axis direction, the leading-around part 1920 is extended on an inner side of the slit 1850 and is connected with the end part 1880 of the flexible circuit board 1800. Therefore, power feeding to the coils 560 is performed through the connector 117. Further, a width of the leading-around part 1920 is smaller than the widths of the first belt-shaped part 1860 and the second belt-shaped part 1870.

(Detailed Structure of Support Body 20)

As shown in FIGS. 2A and 2B, FIGS. 3A and 3B, FIGS. 4A and 4B and FIG. 5, the support body 20 includes a first bottom plate 1400 in a rectangular shape which covers the one side "+Z" in the "Z"-axis direction of the case 1200. In this embodiment, the first bottom plate 1400 is formed with an opening part 1410 for extending the leading-around part 1840 of the flexible circuit board 1800 and the leading-around part 1920 of the flexible circuit board 1900 to an outer side. The opening part 1410 is covered by a second bottom plate 1500 which is overlapped with the first bottom plate 1400 from the one side "+Z" in the "Z"-axis direction. The first bottom plate 1400 is provided with a bottom plate part 1420 in a rectangular shape and side plate parts 1440 which are protruded toward the other side "−Z" in the "Z"-axis direction from four sides of the bottom plate part 1420.

Further, the support body 20 includes a plate-shaped stopper 1300 in a rectangular frame shape which is disposed so as to surround the movable module 10. In this embodiment, a portion located on an inner peripheral side of the plate-shaped stopper 1300 is overlapped with a portion of the frame 1110 of the movable module 10 where the rectangular frame portion 1910 of the flexible circuit board 1900 is adhesively bonded on the one side "+Z" in the "Z"-axis direction. Therefore, the plate-shaped stopper 1300 restricts a movable range of the movable module 10 to the one side "+Z" in the "Z"-axis direction.

An outer circumferential edge of each side of the plate-shaped stopper 1300 is formed with a protruded part 1310 which is protruded toward an outer side. Therefore, when the first bottom plate 1400 and the case 1200 are overlapped in the "Z" direction, the protruded parts 1310 of the plate-shaped stopper 1300 are held between the side plate part 1440 of the first bottom plate 1400 and the side plate parts 1211, 1212, 1213 and 1214 of the case 1200. Accordingly, when the side plate part 1440 of the first bottom plate 1400, the side plate parts 1211, 1212, 1213 and 1214 of the case 1200, and the protruded parts 1310 of the plate-shaped stopper 1300 are joined to each other by welding, the first bottom plate 1400, the plate-shaped stopper 1300 and the case 1200 are unified with each other.

(Structure of Gimbal Mechanism 30)

In the optical unit 100 in this embodiment, in order to correct a shake of hand, the movable module 10 is required to be swingably supported around a first axial line "L1" (see FIG. 2A) intersecting the optical axis "L" direction, and the movable module 10 is required to be swingably supported around a second axial line "L2" (see FIG. 2A) intersecting the optical axis "L" direction and the first axial line "L1". Therefore, a gimbal mechanism 30 (support mechanism) described below is structured between the movable module 10 and the support body 20.

As shown in FIGS. 9A and 9B, in this embodiment, in order to structure the gimbal mechanism 30, a movable frame 32 is used which is formed in a rectangular shape and is fixed to the cover 1600 (see FIG. 2B) through the rectangular frame 25. The movable frame 32 is provided with a first corner part 321, a second corner part 322, a third corner part 323 and a fourth corner part 324 around the optical axis "L". The movable frame 32 is provided with a first connecting part 326, a second connecting part 327, a third connecting part 328 and a fourth connecting part 329, which are extended in a linear shape having a constant width, between the first corner part 321 and the second corner part 322, between the second corner part 322 and the third corner part 323, between the third corner part 323 and the fourth corner part 324, and between the fourth corner part 324 and the first corner part 321. In this embodiment, the first connecting part 326, the second connecting part 327, the third connecting part 328 and the fourth connecting part 329 are provided with meandering parts 326a, 327a, 328a and 329a which are formed by curving the one elongated linear shape in a direction perpendicular to each of their extended directions and the "Z"-axis direction. Therefore, the movable frame 32 is provided with elasticity. The movable frame 32 is a part of the gimbal mechanism 30 which swingably supports the movable module 10 while connecting the movable module 10 with the support body 20. The movable module 10 has a natural vibration which vibrates in the optical axis direction (upper and lower shift direction) of the movable module 10 and a natural vibration which vibrates in a direction (lateral shift direction) perpendicular to the optical axis of the movable module 10.

In this embodiment, a metal ball 38 is fixed to inner sides of the first corner part 321, the second corner part 322, the third corner part 323 and the fourth corner part 324 of the movable frame 32 by welding or the like. The ball 38 structures a protruded part whose hemispheric convex face is directed toward an inner side in the radial direction.

Further, the end plate part 1220 of the case 1200 (support body 20) is fixed with the cover 1600 and the rectangular frame 25 is fixed to the connecting part 1630 of the cover 1600. The rectangular frame 25 is provided with a first corner part 251, a second corner part 252, a third corner part 253 and a fourth corner part 254 around the optical axis "L". The rectangular frame 25 is provided with a first side part 256, a second side part 257, a third side part 258 and a fourth side part 259 between the first corner part 251 and the second corner part 252, between the second corner part 252 and the third corner part 253, between the third corner part 253 and the fourth corner part 254, and between the fourth corner part 254 and the first corner part 251. The first corner part 251, the second corner part 252, the third corner part 253 and the fourth corner part 254 are formed with protruded parts 251a, 252a, 253a and 254a which are protruded toward the other side "−Z" in the "Z"-axis direction. The rectangular frame 25 is fixed to the cover 1600 in a state that the protruded parts 251a, 252a, 253a and 254a are fitted to the holes 1632 formed in the connecting parts 1630 of the cover 1600.

The rectangular frame 25 is provided with support plate parts 255 which are protruded to the one side "+Z" in the "Z"-axis direction (the other side in the optical axis "L" direction) from the second corner part 252 and the fourth corner part 254. In this embodiment, an outer side face in the radial direction of the support plate part 255 is formed with wall faces 255a and 255b which face each other on both sides in the circumferential direction and a wall face 255c which faces the one side "+Z" in the "Z"-axis direction. Therefore, a recessed part is formed between the wall faces 255a and 255b so as to open toward an outer side in the radial direction.

A plate-shaped member 33 which is bent in an "L" shape is fixed between the wall faces 255a and 255b. In this embodiment, the plate-shaped member 33 is provided with a first plate part 331 extended in the "Z"-axis direction and a second plate part 332 which is bent toward an outer side in the radial direction at an end part on the one side "+Z" in the "Z"-axis direction of the first plate part 331. The first plate part 331 is fixed to the wall face 255c and the wall faces 255a and 255b of the support plate part 255 formed in the rectangular frame 25. Therefore, in each of the second corner part 252 and the fourth corner part 254 of the rectangular frame 25, a recessed part which opens toward an outer side in the radial direction is formed so as to be surrounded by the second plate part 332 of the plate-shaped member 33 and the wall faces 255a, 255b and 255c of the support plate part 255. The first plate part 331 of the plate-shaped member 33 is located on an inner side in the radial direction of the recessed part. In this embodiment, an outer side face in the radial direction of the first plate part 331 is formed with a receiving part 330 which is recessed in a hemispheric shape.

Further, on an outer peripheral side of the holder holding part 1120 of the frame 1110 which is protruded toward the other side "−Z" in the "Z"-axis direction (one side in the optical axis "L" direction) from the one side "+Z" in the "Z"-axis direction (the other side in the optical axis "L" direction), recessed parts 1160 are formed on the one side "+X" in the "X"-axis direction and the other side "−Y" in the "Y"-axis direction, and on the other side "−X" in the "X"-axis direction and the one side "+Y" in the "Y"-axis direction.

In this embodiment, a plate-shaped member 34 which is bent in an "L" shape is fixed so as to close the recessed part 1160 from an outer side in the radial direction. In this embodiment, the plate-shaped member 34 is provided a first plate part 341 extended in the "Z"-axis direction and a second plate part 342 which is bent toward an outer side in the radial direction at an end part on the other side "−Z" in the "Z"-axis direction of the first plate part 341. In this embodiment, a receiving part 340 which is recessed in a hemispheric shape is formed on an outer side face in the radial direction of the first plate part 341.

The movable module 10 is swingably supported around the first axial line "L1" intersecting the optical axis "L" direction and is swingably supported around the second axial line "L2" intersecting the optical axis "L" direction and the first axial line "L1" by using the rectangular frame 25, the movable frame 32, the balls 38, the plate-shaped members 33 and 34 and the flame 1110 structured as described above. More specifically, in the swing support part between the second corner part 322 of the movable frame 32 and the second corner part 252 of the rectangular frame 25 and, in the swing support part between the fourth corner part 324 of the movable frame 32 and the fourth corner part 254 of the rectangular frame 25, the plate-shaped members 33 are located on the inner sides of the second corner part 322 and the fourth corner part 324 of the movable frame 32 and the balls 38 are supported by the receiving parts 330. As a result, the second corner part 322 and the fourth corner part 324 of the movable frame 32 located on the first axial line "L1" are swingably supported by the second corner part 252 and the fourth corner part 254 of the rectangular frame 25 (support body 20).

Further, in the swing support part between the first corner part 321 of the movable frame 32 and the frame 1110 and, in the swing support part between the third corner part 323 of the movable frame 32 and the frame 1110, the plate-shaped members 34 provided in the frame 1110 are located on the inner sides of the first corner part 321 and the third corner part 323 of the movable frame 32 and the balls 38 are supported by the receiving parts 340. As a result, the first corner part 321 and the third corner part 323 of the movable frame 32 located on the second axial line "L2" swingably support the frame 1110 (movable module 10).

As described above, the movable module 10 is swingably supported by the support body 20 around the first axial line "L1" and around the second axial line "L2" through the movable frame 32 used in the gimbal mechanism 30.

In this embodiment, each of the movable frame 32 and the plate-shaped members 33 and 34 is located at the same height position (the same position in the "Z"-axis direction) as the coil holding parts 1150. Therefore, when viewed in a direction perpendicular to the optical axis "L" direction, the gimbal mechanism 30 is provided at a position overlapped with the shake correction drive mechanism 500. Especially, in this embodiment, when viewed in a direction perpendicular to the optical axis "L" direction, the gimbal mechanism 30 is provided at a position overlapping with the center in the "Z"-axis direction of the shake correction drive mechanism 500.

In this embodiment, the movable frame 32 is structured of metal material or the like. The first connecting part 326, the second connecting part 327, the third connecting part 328 and the fourth connecting part 329 are provided with the meandering parts 326a, 327a, 328a and 329a each of which is curved in a direction perpendicular to its extended direction and the "Z"-axis direction and thus the movable frame 32 is provided with elasticity. Therefore, the movable frame 32 is not resiliently bent by the own weight of the movable module 10 but, when an impact is applied from an outer side, the movable frame 32 is provided with elasticity capable of absorbing the impact. Further, the first connecting part 326, the second connecting part 327, the third connecting part 328 and the fourth connecting part 329 of the movable frame 32 are respectively capable of being elastically deformed to their inner sides and outer sides. Therefore, the balls 38 and the receiving parts 330 and 340 are elastically contacted with each other in all of the first corner part 321, the second corner part 322, the third corner part 323 and the fourth corner part 324 by elasticity of the first connecting part 326, the second connecting part 327, the third connecting part 328 and the fourth connecting part 329. Accordingly, rattling is not occurred between the balls 38 and the receiving parts 330 and 340.

(Structure of Spring Member 70)

The movable module 10 in this embodiment includes a spring member 70 which is connected with the movable module 10 and the support body 20 to hold a posture of the movable module 10 when the shake correction drive mechanism 500 is set in a stopped state. In this embodiment, the spring member 70 is a spring member 70 which is made by forming a metal plate in a predetermined shape and is provided with a support body side connecting part 71 in a rectangular frame shape, a movable body side connection part 72 in a circular ring shape, and arm parts 73 which connect the support body side connecting part 71 with the movable body side connection part 72. In this embodiment, the arm part 73 is extended from a corner portion of the support body side connecting part 71 to the movable body side connection part 72 while meandering from one side to the other side in a circumferential direction. The spring member 70 operates to tilt the movable module 10 and thus the spring member 70 affects vibration in the tilt direction (swing direction).

The support body side connecting part 71 is fixed to a face on the other side "−Z" in the "Z"-axis direction of the rectangular frame 25, and the movable body side connection part 72 is fixed to an end face on the other side "−Z" in the "Z"-axis direction of the holder holding part 1120 of the frame 1110 by welding, an adhesive or the like. More specifically, the support body side connecting part 71 is fixed to the rectangular frame 25 in a state that the protruded parts 251a, 252a, 253a and 254a of the rectangular frame 25 are fitted to holes 710 of the support body side connecting part 71. Further, protruded parts 1123 are formed on an end face on the other side "−Z" in the "Z"-axis direction of the holder holding part 1120 and the movable body side connection part 72 is fixed to the holder holding part 1120 in a state that the protruded parts 1123 are fitted to cut-out parts 720 of the movable body side connection part 72.

The gimbal mechanism 30 is provided at a position overlapping with the center in the "Z"-axis direction of the shake correction drive mechanism 500 and, on the other hand, the spring member 70 is located on the other side "−Z" in the "Z"-axis direction relative to the position overlapping with the center in the "Z"-axis direction of the shake correction drive mechanism 500.

In this embodiment, the gimbal mechanism 30 and the shake correction drive mechanism 500 are provided in the movable module 10 at a midway position in the "Z"-axis direction. Especially, in this embodiment, the gimbal mechanism 30 and the shake correction drive mechanism 500 are provided at an intermediate position (center position) in the "Z"-axis direction of the movable module 10. Further, the gimbal mechanism 30 and the shake correction drive mechanism 500 are provided at the same position in the "Z"-axis direction as a gravity center position in the "Z"-axis direction of the movable module 10. The position of a center of gravity of the optical module 1 is shifted to the one side "+Z" in the "Z"-axis direction relative to an intermediate position in the "Z"-axis direction. However, in this embodiment, as shown in FIGS. 7A, 7B and 7C, the movable module 10 includes a weight 5 which is attached to an end part on the other side "−Z" in the "Z"-axis direction of the optical module 1. Therefore, the gravity center position of the movable module 10 in the optical axis "L" direction is shifted by the weight 5 to a support position side by the gimbal mechanism 30 (support mechanism) relative to the gravity center position of the optical module 1. Accordingly, the gravity center position of the movable module 10 is located at an intermediate position (center position) in the "Z"-axis direction of the movable module 10 and the gimbal mechanism 30 is provided at the same position as the gravity center position in the "Z"-axis direction.

(Structure and Basic Operation of Shake Correction Drive Mechanism 500 and the Like)

In the optical unit 100 structured as described above, when the optical device 2000 shown in FIG. 1 is shaken, the shake is detected by the gyroscope 13 and a control IC (not shown) controls the shake correction drive mechanism 500. In other words, a drive current for cancelling the shake detected by the gyroscope 13 is supplied to the coils 560. In this case, a part of the four coils 560 is supplied with an electric current and the electric current is not supplied to other coils 560. Alternatively, all of the four coils 560 are supplied with electric currents but the balance of the electric currents supplied to the four coils 560 is controlled. As a result, the movable module 10 is swung around the first axial line "L1" or around the second axial line "L2" and the shake of hand is corrected. Alternatively, the movable module 10 is swung around the first axial line "L1" and is swung around the second axial line "L2" and the shake of hand is corrected.

(Leading-Around Structure of Flexible Circuit Boards 1800 and 1900)

As shown in FIGS. 3A and 3B, in the optical unit 100 in this embodiment, the bottom plate part 1420 of the first base plate 1400 is formed with an opening part 1410. The leading-around part 1840 of the flexible circuit board 1800 and the leading-around part 1920 of the flexible circuit board 1900 connected with the movable module 10 are extended to an outer side of the optical unit 100 through the opening part 1410.

As shown in FIGS. 4A and 4B, FIG. 5 and FIGS. 7A, 7B and 7C, the flexible circuit board 1800 is led out from the one side "+Y" in the "Y"-axis direction relative to the optical axis "L" in the rear side end face 17 in the optical axis "L" direction of the movable module 10. In this embodiment, the flexible circuit board 1800 is led out from an end part on the one side "+Y" in the "Y"-axis direction in the rear side end face 17 in the optical axis "L" direction of the movable module 10 and a boundary portion between the second connected part 1830 and the leading-around part 1840 is the leading-out part. In this embodiment, the leading-around part 1840 is divided into the first belt-shaped part 1860 and the second belt-shaped part 1870. Both of the leading-out part 1861 of the first belt-shaped part 1860 and the leading-out part 1871 of the second belt-shaped part 1870 are located in the boundary portion between the second connected part 1830 and the leading-around part 1840.

The first belt-shaped part 1860 is provided with a first extending part 1862 which is extended from the leading-out part 1861 to the other side "−Y" in the "Y"-axis direction relative to the optical axis "L", a first curved part 1863 which is curved from a tip end side of the first extending part 1862 toward a rear side in the optical axis direction (one side "+Z" in the "Z"-axis direction), and a second extending part 1864 which is extended from the first curved part 1863 toward the one side "+Y" in the "Y"-axis direction. Further, the first belt-shaped part 1860 is provided with a second curved part 1866, which is curved from the leading-out part 1861 toward a rear side in the optical axis direction (one side "+Z" in the "Z"-axis direction), between the leading-out part 1861 and the first extending part 1862. The first extending part 1862 is extended from the second curved part 1866 in a state that the first extending part 1862 faces in parallel with the rear side end face 17 in the optical axis "L" direction of the movable module 10 through a gap space.

A plate-shaped spacer 18 is fixed to the rear side end face 17 of the movable module 10 on the one side "+Y" in the "Y"-axis direction relative to the optical axis "L" with an adhesive and the spacer 18 is disposed between the rear side end face 17 and the first extending part 1862. In this embodiment, the spacer 18 is a plate member formed in a substantially rectangular shape and a face on the other side "−Z" in the "Z"-axis direction of the spacer 18 is formed with recessed parts 182 which function as an adhesive reservoir when the spacer 18 is adhesively bonded to the rear side end face 17 of the movable module 10 with an adhesive. Further, a face on the one side "+Z" in the "Z"-axis direction of the spacer 18 is formed with recessed parts 181 which function as an adhesive reservoir when the spacer 18 is adhesively bonded to the first belt-shaped part 1860, the second belt-shaped part 1870 and the leading-around part 1920 with an adhesive.

In this embodiment, a gyroscope 13 is fixed to the rear side end face 17 of the movable module 10 on an extended line of the optical axis "L". A dimension in the "Z"-axis direction (thickness dimension) of the gyroscope 13 is smaller than that of the spacer 18. Therefore, a gap space is provided between the gyroscope 13 and the first extending part 1862. Further, the gyroscope 13 is disposed at a position adjacent to the spacer 18 on the other side "−Y" in the "Y"-axis direction. The spacer 18 is formed with a recessed part 185 on the other side "−Y" in the "Y"-axis direction and a part of the gyroscope 13 is located on an inner side of the recessed part 185 of the spacer 18. Therefore, the gyroscope 13 can be disposed on the extended line of the optical axis "L".

The second extending part 1864 is extended to an outer side from its midway position through the opening part 1410 of the first base plate 1400 and is fixed to a face on the one side "+Z" in the "Z"-axis direction of the first base plate 1400 on the one side "+Y" in the "Y"-axis direction relative to the optical axis "L". In this embodiment, the second extending part 1864 of the first belt-shaped part 1860 is fixed to the first base plate 1400 with a flexible sheet 19 such as a double-sided adhesive tape and the fixed position is a fixed part 1865 of the support body 20. When viewed in the "Z"-axis direction, the fixed part 1865 is provided at a position overlapping with the leading-out part 1861.

Similarly to the first belt-shaped part 1860, on the other side "−X" in the "X"-axis direction relative to the first belt-shaped part 1860, the second belt-shaped part 1870 is provided with a first extending part 1872 which is extended from the leading-out part 1871 to the other side "−Y" in the "Y"-axis direction relative to the optical axis "L", a first curved part 1873 which is curved from a tip end side of the first extending part 1872 toward the rear side in the optical axis direction (one side "+Z" in the "Z"-axis direction), and a second extending part 1874 which is extended from the first curved part 1873 toward the one side "+Y" in the "Y"-axis direction. Further, similarly to the first belt-shaped part 1860, the second belt-shaped part 1870 is also provided with a second curved part 1876, which is curved from the leading-out part 1871 toward the rear side in the optical axis direction (one side "+Z" in the "Z"-axis direction), between the leading-out part 1871 and the first extending part 1872. The first extending part 1872 is extended from the second curved part 1876 in a state that the first extending part 1872 faces in parallel with the rear side end face 17 in the optical axis "L" direction of the movable module 10 through a gap space. Further, the spacer 18 is disposed between the rear side end face 17 and the first extending part 1872. Further, the second extending part 1874 is, similarly to the second extending part 1864, extended to an outer side from its midway position through the opening part 1410 of the first base plate 1400 and is fixed to the face on the one side "+Z" in the "Z"-axis direction of the first base plate 1400 on the one side "+Y" in the "Y"-axis direction relative to the optical axis "L". Therefore, the fixed position by the sheet 19 is a fixed part 1875 of the second belt-shaped part 1870 to the support body 20.

The leading-around part 1920 is led out from the rear side in the optical axis "L" direction of the frame 1110. Similarly to the first belt-shaped part 1860 and the second belt-shaped part 1870, the leading-around part 1920 is provided, at a position interposed between the first belt-shaped part 1860 and the second belt-shaped part 1870 in the "X"-axis direction, with a first extending part 1922 which is extended from the leading-out part 1921 to the other side "−Y" in the "Y"-axis direction relative to the optical axis "L", a first curved part 1923 which is curved from a tip end side of the first extending part 1922 toward the rear side in the optical axis direction (one side "+Z" in the "Z"-axis direction), and a second extending part 1924 which is extended from the first curved part 1923 toward the one side "+Y" in the "Y"-axis direction. Further, the leading-around part 1920 is, similarly to the first belt-shaped part 1860 and the second belt-shaped part 1870, also provided with a second curved part 1926, which is curved from the leading-out part 1921 toward the rear side in the optical axis direction (one side "+Z" in the "Z"-axis direction), between the leading-out part 1921 and the first extending part 1922. The first extending part 1922 is extended from the second curved part 1926 in a state that the first extending part 1922 faces in parallel with the rear side end face 17 in the optical axis "L" direction of the movable module 10 through a gap space. Further, the spacer 18 is disposed between the rear side end face 17 and the first extending part 1922. Further, the second extending part 1924 is, similarly to the second extending parts 1864 and 1874, extended to an outer side from its midway position through the opening part 1410 of the first base plate 1400 and is fixed to the face on the one side "+Z" in the "Z"-axis direction of the first base plate 1400 on the one side "+Y" in the "Y"-axis direction relative to the optical axis "L". Therefore, the fixed position by the sheet 19 is a fixed part 1925 of the leading-around part 1920 to the support body 20.

(Frequency Characteristics of Vibration)

Figure 10:
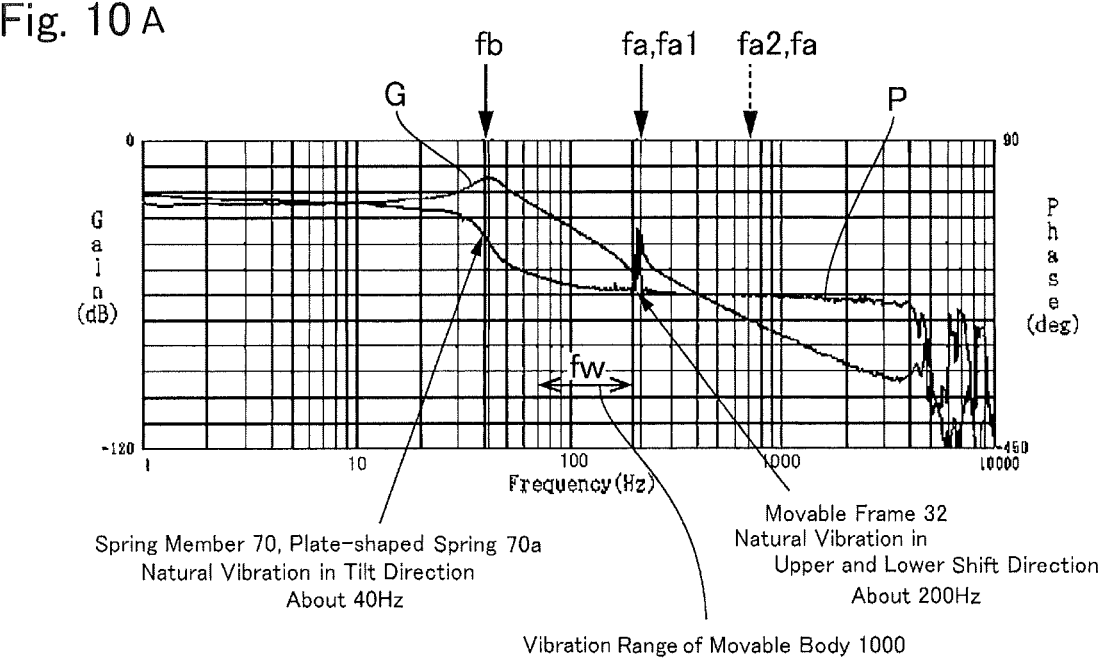
FIGS. 10A and 10B are explanatory views showing frequency characteristics of vibration of an optical unit with a shake correction function.
Figure 10:
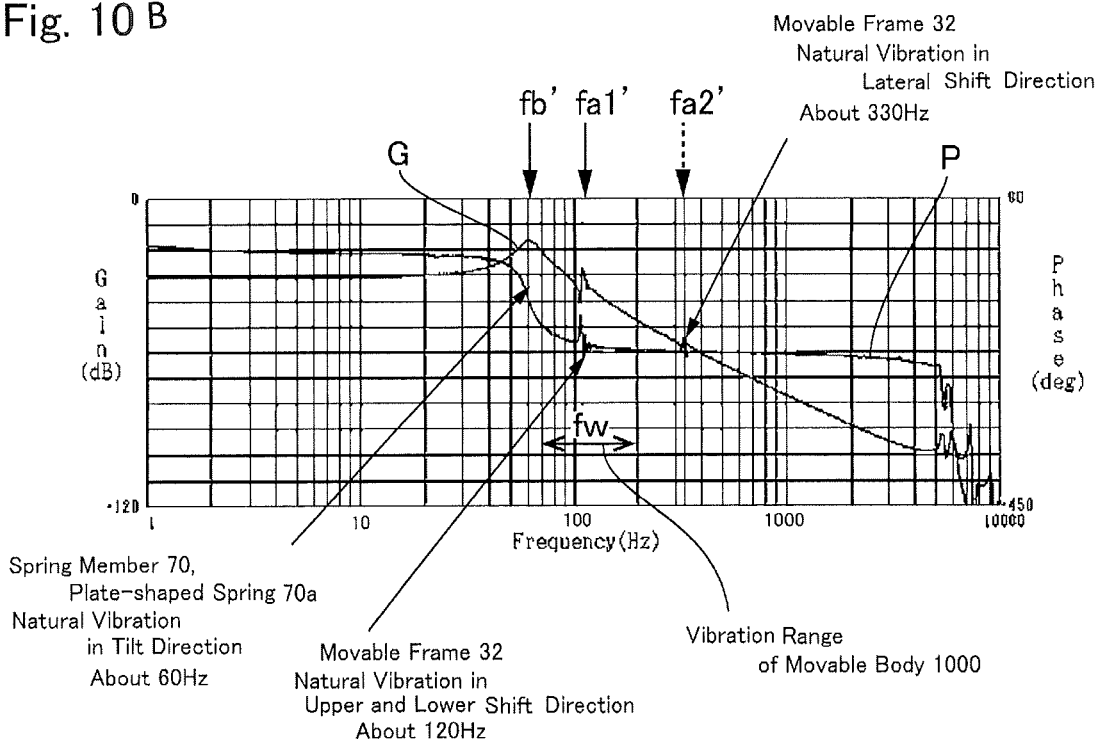

FIGS. 10A and 10B are explanatory views showing frequency characteristics of vibration of an optical unit with a shake correction function. FIG. 10A is an explanatory view showing frequency characteristics of vibration of the optical unit 100 with a shake correction function in accordance with an embodiment of the present invention, and FIG. 10B is an explanatory view showing frequency characteristics of vibration of an optical unit 100 with a shake correction function in a reference example. The frequency characteristics shown in FIG. 10B of an optical unit in a reference example are obtained under the following conditions:

Thickness of the spring member 70 (plate-shaped spring 70*a*)=0.1 mm

Width of the arm part 73 of the spring member 70 (plate-shaped spring 70*a*)=0.110 mm Thickness of the movable frame 32=0.25 mm Width of the meandering parts 326*a*, 327*a*, 328*a* and 329*a*=0.2 mm In FIGS. 10A and 10B, a gain of the frequency response function is indicated by the solid line "G" and its phase is indicated by the solid line "P".

As shown in FIG. 1, the optical unit 100 in this embodiment (optical unit with a shake correction function) is mounted on a movable body 1000 such as a vehicle or a radio-controlled helicopter and photographing is performed by the optical unit 100 in the movable body 1000. In this case, when acceleration and deceleration are considered, a width of the vibration frequency band "fw" of the movable body 1000 becomes, for example, about 130 Hz.

The natural vibration frequency in a tilt direction (swing direction) of the movable module 10 is specified by the natural vibration frequency "fb" of the spring member 70 (plate-shaped spring 70*a*) for holding posture of the movable module 10. Further, the natural vibration frequency in the optical axis direction (upper and lower shift direction) of the movable module 10 is specified by the natural vibration frequency "fa1" in the optical axis direction (upper and lower shift direction) of the natural vibration frequency "fa" of the movable frame 32 used in the gimbal mechanism 30. Further, the natural vibration frequency of the movable module 10 in a direction perpendicular to the optical axis (lateral shift direction) is specified by the natural vibration frequency "fa2" in the direction perpendicular to the optical axis (lateral shift direction) of the natural vibration frequency "fa" of the movable frame 32 used in the gimbal mechanism 30.

Therefore, in this embodiment, the width of the arm part 73 is narrowed from 0.110 mm to 0.065 mm in a state that the thickness of the spring member 70 (plate-shaped spring 70*a*) is remained to be 0.1 mm. Therefore, as shown in FIG. 10A, the natural vibration frequency in the tilt direction (swing direction) of the movable module 10 (natural vibration frequency "fb" of the spring member 70 (plate-shaped spring 70*a*)) is shifted to a low frequency side from about 60 Hz to about 40 Hz as understood in comparison with the frequency characteristics shown in FIG. 10B.

Further, in this embodiment, the thickness of the movable frame 32 is increased from 0.25 mm to 0.8 mm and the width of the first connecting part 326, the second connecting part 327, the third connecting part 328 and the fourth connecting part 329 (meandering parts 326*a*, 327*a*, 328*a* and 329*a*) is widened from 0.2 mm to 0.24 mm. The movable frame 32 is produced by etching a metal plate with a photo lithography technique. Therefore, when the thickness of the movable frame 32 is increased to 0.8 mm, accuracy of its shape and dimension after etching is decreased. Accordingly, in this embodiment, the movable frame 32 is formed by bonding a plurality of plate members having the same shape to each other in the optical axis direction (thickness direction). In this embodiment, the movable frame 32 is formed by bonding two plate members having the same shape and whose thickness is 0.4 mm to each other in the optical axis direction (thickness direction). Therefore, a high degree of accuracy of the shape and dimension of the movable frame 32 can be obtained.

According to the movable frame 32 described above, as shown in FIG. 10A, the natural vibration frequency in the optical axis direction (upper and lower shift direction) of the movable module 10 (natural vibration frequency "fa1" in the optical axis direction (upper and lower shift direction) of the movable frame 32) is shifted to a high frequency side from about 120 Hz to about 220 Hz as understood in comparison with the frequency characteristics shown in FIG. 10B. Further, as shown in FIG. 10A, the natural vibration frequency of the movable module 10 in a direction perpendicular to the optical axis (lateral shift direction) (natural vibration frequency "fa2" of the movable frame 32 in a direction perpendicular to the optical axis (lateral shift direction)) is, as understood in comparison with the frequency characteristics shown in FIG. 10B, shifted to a high frequency side to about 700 Hz and becomes inconspicuous.

As a result, the natural vibration frequency "fa" of the movable frame 32, the natural vibration frequency "fb" of the spring member 70, and the vibration frequency band "fw" of the movable body 1000 satisfy the following relationship;

"fb"<"fw"<"fa".

Therefore, the natural vibration frequency "fa" of the movable frame 32 and the natural vibration frequency "fb" of the spring member 70 are shifted from the vibration frequency band "fw" of the movable body 1000. Accordingly, even when the optical unit 100 is mounted on the movable body 1000, resonance is hard to be generated in the movable module 10.

Further, in this embodiment, instead of shifting the natural vibration frequency "fb" of the spring member 70 to a high frequency side, the natural vibration frequency "fb" of the spring member 70 is shifted to a low frequency side so as to satisfy the following expression;

"fb"<"fw".

As a result, a spring coefficient of the spring member 70 is set to be small and thus, a drive force when the movable module 10 is driven for swinging is small. Therefore, the magnet 520 used in the shake correction drive mechanism 500 can be made thin. Further, responsibility and the like when the movable module 10 is driven for swinging is improved.

Further, in the natural vibration frequency "fa" of the movable frame 32, the natural vibration frequency "fa1" in the optical axis direction and the natural vibration frequency "fa2" in a direction perpendicular to the optical axis satisfy the following relationship;

"fw"<"fa".

Therefore, in this embodiment, the natural vibration frequency "fa" of the movable frame 32 (natural vibration frequency "fa1" in the optical axis direction and the natural vibration frequency "fa2" in a direction perpendicular to the optical axis) is not shifted to a low frequency side. Instead, the natural vibration frequency "fa" is shifted to a high frequency side so as to satisfy the following expression;

"fw"<"fa".

Therefore, in comparison with a case that the natural vibration frequency "fa" of the movable frame 32 (natural vibration frequency "fa1" in the optical axis direction and natural vibration frequency "fa2" in a direction perpendicular to the optical axis) is shifted to a low frequency side, the natural vibration frequency "fa" of the movable frame 32 (natural vibration frequency "fa1" in the optical axis direction and natural vibration frequency "fa2" in a direction perpendicular to the optical axis) is easily shifted from the vibration frequency band "fw" of the movable body 1000.

Further, a difference between the natural vibration frequency "fa" of the movable frame 32 and the natural vibration frequency "fb" of the spring member 70 is 135 Hz or more. According to this difference, for example, during an image-pickup period, even when the vibration frequency band "fw" of the movable body 1000 has a width of ±65 Hz (width of 130 Hz) due to acceleration and deceleration of the movable body 1000 such as a vehicle or a radio-controlled helicopter, the natural vibration frequency "fa" of the movable frame 32 and the natural vibration frequency "fb" of the spring member 70 are shifted from the vibration frequency band "fw" of the movable body 1000. Further, in a case that a difference between the natural vibration frequency "fa" of the movable frame 32 and the natural vibration frequency "fb" of the spring member 70 is set to more than 135 Hz, it is not preferable for holding the posture of the movable module 10 and the like. However, according to this embodiment, a margin of about 5 Hz is provided with respect to the width of 130 Hz (±65 Hz) of the vibration frequency band "fw" of the movable body 1000 and thus holding of the posture of the movable module 10 and the like can be appropriately performed while preventing resonance of the movable module 10.

Principal Effects in this Embodiment

As described above, in the optical unit 100 in this embodiment, the movable module 10 is supported by the gimbal mechanism 30 and thus shake correction for a large shake can be surely performed. Further, the gimbal mechanism 30 is provided at a midway position in the "Z"-axis direction of the movable module 10 and thus the movable module 10 swings with the midway position in the "Z"-axis direction of the movable module 10. Therefore, in a case that the movable module 10 is swung over the same angle, the maximum value of a displacement amount on a front side in the optical axis direction of the movable module 10 in the "X"-axis direction and the "Y"-axis direction is smaller than that in the structure that the movable module 10 is swung with the rear side in the optical axis direction as a swing center. Accordingly, a large space is not required to secure in a direction perpendicular to the optical axis "L" direction around the movable module 10 and thus the size in a direction perpendicular to the optical axis "L" direction of the optical unit 100 can be reduced.

In a case that the movable module 10 is supported by the gimbal mechanism 30, it is required that the movable frame 32 having elasticity is used and that the posture of the movable module 10 is held by the spring member 70 (plate-shaped spring 70a). As a result, a natural vibration frequency corresponding to the natural vibration frequency "fa" of the movable frame 32 is present in the movable module 10, and a natural vibration frequency corresponding to the natural vibration frequency "fb" of the spring member 70 (plate-shaped spring 70a) is present in the movable module 10. However, in this embodiment, as described with reference to FIG. 10A, the natural vibration frequency "fa" of the movable frame 32 and the natural vibration frequency "fb" of the spring member 70 are shifted from the vibration frequency band "fw" of the movable body 1000. Therefore, even when the optical unit 100 is mounted on the movable body 1000, resonance of the movable module 10 can be suppressed and effects described with reference to FIGS. 10A and 10B can be attained.

In a case that the movable module 10 is swung with a midway position in the "Z"-axis direction of the movable module 10 as a swing center, a displacement amount of the movable module 10 is larger on its rear side in the optical axis direction than that of a structure that the movable module 10 is swung with a rear side in the optical axis direction as a swing center. Therefore, displacement amounts of the leading-around parts 1840 and 1920 of the flexible circuit boards 1800 and 1900 provided on the rear side in the optical axis direction of the movable module 10 become large. However, in this embodiment, the flexible circuit boards 1800 and 1900 are provided with the first extending parts 1862, 1872 and 1922, which are extended from the leading-out parts 1861, 1871 and 1921 located on one side "+Y" in the "Y"-axis direction with respect to the optical axis "L" to the other side "−Y" in the "Y"-axis direction with respect to the optical axis "L", the first curved parts 1863, 1873 and 1923, which are curved on the tip end sides of the first extending parts 1862, 1872 and 1922 toward the rear side in the optical axis direction, and the second extending parts 1864, 1874 and 1924 which are extended from the first curved parts 1863, 1873 and 1923 toward the one side "+Y" in the "Y"-axis direction. Further, the fixed parts 1865, 1875 and 1925 of the second extending parts 1864, 1874 and 1924 which are connected with the support body 20 are located on the one side "+Y" in the "Y"-axis direction with respect to the optical axis "L". Therefore, the dimensions from the leading-out parts 1861, 1871 and 1921 of the flexible circuit boards 1800 and 1900 to the fixed parts 1865, 1875 and 1925 are long and thus, when the movable module 10 is swung, forces applied to the movable module 10 from the flexible circuit boards 1800 and 1900 are small. Accordingly, the movable module 10 can be appropriately swung and thus a shake such as a hand shake can be corrected appropriately.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A resonance prevention method in an optical unit with a shake correction function for preventing resonance of a movable module when the optical unit is mounted on a movable body, the method comprising providing the optical unit including the movable module holding an optical element, a support body having a body part surrounding the movable module, a gimbal mechanism including a movable frame having elasticity configured to swingably support the movable module between the movable module and the support body, a spring member connected to the movable module and the support body for holding posture of the movable module, and a shake correction drive mechanism configured to swing the movable module, wherein the movable module is required to be swingably supported around a first axial line intersecting an optical axis direction, and the movable module is required to be swingably supported around a second axial line intersecting the optical axis direction and the first axial line, wherein the movable frame is provided with a first corner part, a second corner part, a third corner part and a fourth corner part around the optical axis, wherein the support body is provided with a first corner part, a second corner part, a third corner part and a fourth corner part around the optical axis, wherein the second corner part and the fourth corner part of the movable frame located on the first axial line are swingably supported by the second corner part and the fourth corner part of the support body, wherein the first corner part and the third corner part of the movable frame located on the second axial line swingably support the movable module, and wherein when a natural vibration frequency of the movable frame is "fa", a natural vibration frequency of the spring member is "fb", and a vibration frequency band of the movable body on which the support body is mounted is "fw", the natural vibration frequency "fa" of the movable frame and the natural vibration frequency "fb" of the spring member are shifted from the vibration frequency band "fw" of the movable body.

2. An optical unit with a shake correction function comprising:

a movable module structured to hold an optical element;

a support body which comprises a body part surrounding the movable module;

a gimbal mechanism which comprises a movable frame having elasticity structured to swingably support the movable module between the movable module and the support body;

a spring member which is connected to the movable module and the support body for holding posture of the movable module; and a shake correction drive mechanism structured to swing the movable module;

wherein the movable module is required to be swingably supported around a first axial line intersecting an optical axis direction, and the movable module is required to be swingably supported around a second axial line intersecting the optical axis direction and the first axial line, wherein the movable frame is provided with a first corner part, a second corner part, a third corner part and a fourth corner part around the optical axis, wherein the support body is provided with a first corner part, a second corner part, a third corner part and a fourth corner part around the optical axis, wherein the second corner part and the fourth corner part of the movable frame located on the first axial line are swingably supported by the second corner part and the fourth corner part of the support body, wherein the first corner part and the third corner part of the movable frame located on the second axial line swingably support the movable module, and wherein when a natural vibration frequency of the movable frame is "fa", a natural vibration frequency of the spring member is "fb", and a vibration frequency band of a movable body on which the support body is mounted is "fw", the natural vibration frequency "fa" of the movable frame and the natural vibration frequency "fb" of the spring member are shifted from the vibration frequency band "fw" of the movable body.

3. The optical unit with a shake correction function according to claim 2, wherein the natural vibration frequency "fb" of the spring member and the vibration frequency band "fw" of the movable body satisfy a following relationship;

"fb"<"fw".

4. The optical unit with a shake correction function according to claim 3, wherein the natural vibration frequency "fa" of the movable frame, the natural vibration frequency "fb" of the spring member, and the vibration frequency band "fw" of the movable body satisfy a following relationship;

"fb"<"fw"<"fa".

5. The optical unit with a shake correction function according to claim 4, wherein a difference between the natural vibration frequency "fa" of the movable frame and the natural vibration frequency "fb" of the spring member is set to be 135 Hz or more.

6. The optical unit with a shake correction function according to claim 5, wherein in the natural vibration frequency "fa" of the movable frame, when a natural vibration frequency in an optical axis direction is "fa1" and a natural vibration frequency in a direction perpendicular to the optical axis is "fa2", the natural vibration frequency "fa1" and the natural vibration frequency "fa2" satisfy a following relationship;

"fa1"<"fa2".

7. The optical unit with a shake correction function according to claim 4, wherein
a natural vibration frequency in a swing direction of the movable module is specified by the natural vibration frequency "fb" of the spring member,
a natural vibration frequency in the optical axis direction of the movable module is specified by a natural vibration frequency "fa1" in the optical axis direction of the natural vibration frequency "fa" of the movable frame,
a natural vibration frequency in a direction perpendicular to the optical axis direction of the movable module is specified by a natural vibration frequency "fa2" in a direction perpendicular to the optical axis direction of the natural vibration frequency "fa" of the movable frame, and
the natural vibration frequency "fa1" and the natural vibration frequency "fa2" satisfy a following relationship;

"fa1"<"fa2".

8. The optical unit with a shake correction function according to claim 2, wherein a difference between the natural vibration frequency "fa" of the movable frame and the natural vibration frequency "fb" of the spring member is 135 Hz or more.

9. The optical unit with a shake correction function according to claim 8, wherein the spring member is a plate-shaped spring whose thickness direction is directed in an optical axis direction.

10. The optical unit with a shake correction function according to claim 2, wherein in the natural vibration frequency "fa" of the movable frame, when a natural vibration frequency in an optical axis direction is "fa1" and a natural vibration frequency in a direction perpendicular to the optical axis is "fa2", the natural vibration frequency "fa1" and the natural vibration frequency "fa2" satisfy a following relationship;

"fa1"<"fa2".

11. The optical unit with a shake correction function according to claim 10, wherein the movable frame comprises a plurality of plate members having the same shape and are bonded with each other in the optical axis direction.

12. The optical unit with a shake correction function according to claim 2, wherein
the optical element is a lens which is held by a holder,
the movable module is mounted with a coil structuring the shake correction drive mechanism,
the movable frame of the gimbal mechanism is provided at a midway position of the movable module in an optical axis direction of the lens so that the movable module is swing with the midway position of the movable module as a swing center,
a flexible circuit board which is electrically connected with the coil structuring the shake correction drive mechanism is led around so as to enable to swing the movable module on one side in the optical axis direction with respect to the gimbal mechanism, and
the spring member is provided on the other side in the optical axis direction with respect to the gimbal mechanism.

13. The optical unit with a shake correction function according to claim 12, wherein
the movable frame is formed in a rectangular shape having four corner parts,
the movable frame is provided with meandering parts which are formed by curving a linear shape having a constant width between respective corner parts, and
the movable module is swingably supported by the movable frame around a first axial line intersecting the optical axis direction of the lens and around a second axial line intersecting the optical axis direction and the first axial line.

14. The optical unit with a shake correction function according to claim 12, wherein
the spring member is provided with a support body side connecting part in a rectangular frame shape, a movable body side connection part in a circular ring shape, and arm parts which connect the support body side connecting part with the movable body side connection part, and
the arm part is extended to the movable body side connection part while turning around from a corner portion of the support body side connecting part in a circumferential direction.

15. The optical unit with a shake correction function according to claim 2, wherein
the optical unit is mounted on the movable body which is subjected to be accelerated and decelerated and in which vibration and swinging are occurred,
the vibration frequency band "fw" of the movable body is determined on a basis of vibration of the movable body due to assumed vibration, swinging and acceleration or deceleration.

16. An optical unit with a shake correction function comprising:
a movable module structured to hold an optical element;
a support body which comprises a body part surrounding the movable module;
a gimbal mechanism which comprises a movable frame having elasticity and is structured to swingably support the movable module between the movable module and the support body;
a spring member which is connected to the movable module and the support body for holding posture of the movable module; and
a shake correction drive mechanism structured to swing the movable module;
wherein the movable module is required to be swingably supported around a first axial line intersecting an optical axis direction, and the movable module is required to be swingably supported around a second axial line intersecting the optical axis direction and the first axial line,
wherein the movable frame is provided with a first corner part, a second corner part, a third corner part and a fourth corner part around the optical axis,
wherein the support body is provided with a first corner part, a second corner part, a third corner part and a fourth corner part around the optical axis,
wherein the second corner part and the fourth corner part of the movable frame located on the first axial line are swingably supported by the second corner part and the fourth corner part of the support body, wherein the first corner part and the third corner part of the movable frame located on the second axial line swingably support the movable module, and wherein when a natural vibration frequency of the movable frame is "fa", a natural vibration frequency of the spring member is "fb", a difference between the natural vibration frequency "fa" of the movable frame and the natural vibration frequency "fb" of the spring member is set to be 135 Hz or more.

17. The optical unit with a shake correction function according to claim 16, wherein the natural vibration frequency "fa" of the movable frame and the natural vibration frequency "fb" satisfy a following relationship;

"fb"<"fa".

18. The optical unit with a shake correction function according to claim 16, wherein in the natural vibration frequency "fa" of the movable frame, when a natural vibration frequency in an optical axis direction is "fa1" and a natural vibration frequency in a direction perpendicular to the optical axis direction is "fa2", the natural vibration frequency "fa1" and the natural vibration frequency "fa2" satisfy a following relationship;

"fa1"<"fa2".

19. The optical unit with a shake correction function according to claim 16, wherein the movable frame comprises a plurality of plate members having the same shape and are bonded with each other in an optical axis direction.

20. The optical unit with a shake correction function according to claim 16, wherein the spring member is a plate-shaped spring whose thickness direction is directed in an optical axis direction.

21. The optical unit with a shake correction function according to claim 16, wherein
the optical unit is mounted on the movable body which is subjected to be accelerated and decelerated and in which vibration and swinging are occurred,
the vibration frequency band "fw" of the movable body is determined on a basis of vibration of the movable body due to assumed vibration, swinging and acceleration or deceleration.

* * * * *